(12) United States Patent
Lindsay et al.

(10) Patent No.: US 12,437,249 B2
(45) Date of Patent: Oct. 7, 2025

(54) INTELLIGENT INTEGRATION SYSTEMS AND METHODS WITH DIGITAL AVATARS

(71) Applicant: OPEN TEXT HOLDINGS, INC., Menlo Park, CA (US)

(72) Inventors: Walter Hughes Lindsay, Phoenix, AZ (US); Matthew Charles Catlin, Thornton-Cleveleys (GB); Robert Ernest Greenhalgh, Bolton (GB)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 273 days.

(21) Appl. No.: 18/307,731

(22) Filed: Apr. 26, 2023

(65) Prior Publication Data

US 2023/0359968 A1    Nov. 9, 2023

Related U.S. Application Data

(60) Provisional application No. 63/334,689, filed on Apr. 26, 2022, provisional application No. 63/334,687, filed on Apr. 26, 2022.

(51) Int. Cl.
| | |
|---|---|
| *G06Q 10/0631* | (2023.01) |
| *G06F 9/445* | (2018.01) |
| *G06F 16/25* | (2019.01) |
| *G06F 16/28* | (2019.01) |

(52) U.S. Cl.
CPC ... *G06Q 10/06316* (2013.01); *G06F 9/44505* (2013.01); *G06F 16/25* (2019.01); *G06F 16/288* (2019.01)

(58) Field of Classification Search
None
See application file for complete search history.

(56) References Cited

U.S. PATENT DOCUMENTS

| | | | | |
|---|---|---|---|---|
| 2020/0372194 | A1* | 11/2020 | Lopez | G06F 30/20 |
| 2023/0342725 | A1 | 10/2023 | Lindsay et al. | |
| 2023/0359470 | A1 | 11/2023 | Lindsay et al. | |
| 2024/0061983 | A1* | 2/2024 | Lopez | G06F 30/20 |

OTHER PUBLICATIONS

Office Action issued by the U.S. Patent and Trademark Office (USPTO) for U.S. Appl. No. 18/307,737, mailed Jun. 2, 2025, 10 pages.

* cited by examiner

*Primary Examiner* — Amresh Singh
(74) *Attorney, Agent, or Firm* — SPRINKLE IP LAW GROUP

(57) ABSTRACT

An intelligent integration system runs a workflow implementation in a test mode with an avatar, a set of handlers, and a choreography. The system receives a message from the second entity to the first entity via their respective avatars. The arrival of data in the message triggers the first entity to invoke an integration activity which utilizes the set of handlers. The integration activity follows the choreography and moving the data through the choreography is defined and governed by a choreography key. The system may stop moving the data through the choreography, determine/generate a handler that can meet a requirement of the choreography key that is not met by the set of handlers, and update the workflow implementation to include the handler. The system may then continue or restart the workflow implementation with the handler that can meet the requirement of the choreography key.

20 Claims, 34 Drawing Sheets

| Interface Tree | Type | Presentation | Valu... | Virtual Items | Def... |
|---|---|---|---|---|---|
| ☐ ••• Document | | | | | |
| ⊟ ••• Document - Freeway Document C | | | | | |
| ⟜Ⓐ CwrapperType | Text ... | String | 0..* | | |
| ⟜Ⓐ CdocumentSubType (0..1) | Text ... | String | 0..* | | |
| ⟜Ⓐ CcoreVersion | Text ... | String | 0..* | | |
| ⟜Ⓐ CdllVersion | Text ... | String | 0..* | | |
| ⟜Ⓐ CwrapperVersion | Number ... | Integer ... | *,0 | | |
| ⟜Ⓐ CmanuallyCreated (0..1) | Boolean ... | Boolean | 0..* | | |
| ⟜Ⓐ CisCreatedFromSplit (0..1) | Boolean ... | Boolean | 0..* | | |
| ⊞ ••• XrefHistory (0..1) | | | | | |
| ⊞ ••• FinancialRuleSetHistory (0..1) | | | | | |
| ⊞ •: EdBatchInformation (0..1) | | | | | |
| ⊟ •: Header | | | | | |
| ⊞ ••• Entities | | | | | |
| ⊟ ••• Identifiers (0..1) | | | | | |
| ⊟ ?.. Identifier (1..50) - Identifie | | | | | |
| ⟜Ⓐ Cfunction | Text ... | String | 0..* | | |
| ⟜Ⓐ Cowner (0..1) | Text ... | String | 0..* | | |
| ⟜Ⓐ Ckey (0..1) | Text ... | String | 0..* | | |
| ⟜[C] *body (0..1) | Text ... | String | 0..* | | |
| ⊞ ••• References (0..1) | | | | | |
| ⊟ ••• DatesAndTimes (0..1) | | | | | |
| ⊟ ?.. DateTime (1..50) - DateT | | | | | |
| ⟜Ⓐ Cfunction | Text ... | String | 0..* | | |
| ⟜Ⓐ Cowner (0..1) | Text ... | String | 0..* | | |
| ⟜[C] Date (0..1) | Date ... | YYYY-MM-DD ... | 0..* | | |
| ⟜[C] Time (0..1) | Time ... | H:mm:ss(.ss ... | 0..* | | |
| ⊞ ••• TextData (0..1) | | | | | |
| ⊞ ••• Currencies (0..1) | | | | | |
| ⊟ ••• Flags (0..1) | | | | | |
| ⟜[C] Status (0..1) | Text ... | String | 0..* | | |
| ⊞ ••• PaymentTerms (0..1) | | | | | |
| ⊞ ••• TaxExemption (0..1) | | | | | |
| ⊟ ••• ShippingTerms (0..1) | | | | | |
| ⟜[C] MessageFunction (0..1) | Text ... | String | 0..* | | |
| ⊞ ?.. Details (0..5) | | | | | |
| ⊞ •: Footer | | | | | |

| Permitted Values |
|---|
| |
| Asn, Catalogue, CreditNote, DebitNote, DeliveryConfirmation, DeliveryForecast, DeliveryNote, Invoice, L... |
| |
| |
| |
| |
| |
| |
| |
| |
| |
| |
| AccountCode, AlternateProductCode, CarrierTrackingNumber, ConsigneeCode, DUNS, DeliveryDockCo... |
| Carrier, Company, EndCustomer, Manufacturer, OrderingOffice, Partner, ShipFrom, ShipTo, ShipVia, Sys... |
| |
| |
| |
| |
| ActionDateAndTime, AdditionalReferenceDateTime, AirCargoManifestDateTime, AsnReferenceDateTime... |
| Carrier, Company, EndCustomer, Manufacturer, OrderingOffice, Partner, ShipFrom, ShipTo, ShipVia, Sys... |
| |
| |
| |
| |
| Accepted, Added, Amended, BackOrdered, Canceled, Deleted, DiscontinuedItem, FreeOfChargeItem, H... |
| |
| |
| Amendment, Confirmation, Delete, Duplicate, FinalTransmission, New, Original, Query, Replacement, Test |

FROM FIG. 21A

INTELLIGENT INTEGRATION SYSTEMS AND METHODS WITH DIGITAL AVATARS

CROSS-REFERENCE TO RELATED APPLICATIONS

This disclosure claims a benefit of priority under 35 U.S.C. § 119(e) from U.S. Provisional Application No. 63/334,687, filed Apr. 26, 2022, entitled "INTELLIGENT INTEGRATION SYSTEMS AND METHODS WITH DIGITAL AVATARS," and U.S. Provisional Application No. 63/334,689, filed Apr. 26, 2022, entitled "INTELLIGENT INTEGRATION SYSTEMS AND METHODS WITH GAP ANALYSIS," both of which are fully incorporated by reference herein for all purposes.

TECHNICAL FIELD

This disclosure relates generally to electronic information exchange in a distributed computing environment. More particularly, this disclosure relates to intelligent integration systems, methods, and computer program products that enable entities to electronically exchange information as well as documents such as Electronic Data Interchange (EDI) documents across disparate distributed systems in a way that meets complex information exchange requirements.

BACKGROUND OF THE RELATED ART

Today, enterprises and entities alike recognize the tremendous cost savings by exchanging business documents with their trading partners via an electronic communication method referred to as the Electronic Data Interchange (EDI). An electronic information exchange platform may provide various services to networked enterprise systems so that documents such as invoices, purchase orders, etc. can be exchanged over a network, for instance, using EDI. Skilled artisans appreciate that such an electronic information exchange platform has the necessary resources (e.g., hardware, software, personnel, etc.) to provide services that enable the real-time flow or exchange of information electronically in a network environment.

Given the vast amounts of data involved in the real-time flow or exchange of information electronically in a network environment, scaling up the capability of an electronic information exchange platform to perform such services in a secure, fast, and reliable manner can be problematic and cost prohibitive.

One reason why scaling up the capability of an electronic information exchange platform can be problematic and cost prohibitive is that complex and time consuming manual coding and configuration is needed for each enterprise system (client) that wants to connect to the electronic information exchange platform and for each service (which is managed and provided by the electronic information exchange platform) that each client system wants to use.

Complicating the matter is that these systems can be very diverse and may be located in various geographical and/or jurisdictional locations, with disparate formats/system/application/device requirements. Further, depending upon the roles of these client systems (e.g., buyers, sellers, suppliers, etc.), they may have very different electronic information exchange requirements. Consequently, an intelligent integration solution is needed to provide these client systems with a secure and effective way to connect, converse, and exchange information electronically, while meeting diverse and continuously changing mandates and requirements. Embodiments disclosed herein can meet this need and more.

SUMMARY OF THE DISCLOSURE

In some embodiments, an intelligent integration system implementing a method for intelligent integration for integration may run a workflow implementation in a test mode in a computing environment. The intelligent integration system may be communicatively connected to a plurality of entities and operate avatars for the plurality of entities, including a first avatar representing a first computing system in a first computing environment of a first entity and a second avatar representing a second computing system in a second computing environment of a second entity. The workflow implementation comprises the first avatar, a set of handlers, and a choreography. The system operates in a third computing environment that is different from the first computing environment and the second computing environment. In some embodiments, the avatar of the first entity is operable to transform the data using mapping rules. In some embodiments, the workflow implementation may comprise a data model of data groups and data items for the workflow implementation; states of the workflow implementation; a set of transitions allowed between the states; a set of validation rules applicable to the set of transitions; a set of transactions composed of the data items; enrichment rules for populating data in a transaction for a transition; and an initial set of transactions in the set of transactions.

In some embodiments, the intelligent integration system may run a second workflow implementation in the test mode. The second workflow implementation may comprise a second avatar, a second set of handlers, and another choreography. The second entity can be one of a plurality of entities that communicate with the first entity electronically. In some embodiments, the first entity and the second entity can be trading partners that communicate electronically through an information exchange platform. The intelligent integration system may operate on the information exchange platform and the first computing system and the second computing system can be communicatively connected to the intelligent integration system through the information exchange platform.

As a non-limiting example, the first entity can represent a buyer and the second entity can represent a seller. In some embodiments, the intelligent integration system may apply automation for adapting to new requirements of a fourth entity that facilitates moving the data through the choreography (e.g., for the first workflow implementation or the second workflow implementation).

In the test mode, the system may receive a message from the second entity to the first entity. The message contains data and the arrival of the data from the second entity triggers the first entity to invoke an integration activity which utilizes the set of handlers. The integration activity follows the choreography, which has a choreography key, and moving the data through the choreography is defined and governed by the choreography key. In some embodiments, the set of handlers is capable of interacting with multiple application programming interfaces (APIs), files, and databases to extract or inject necessary data for a plurality of integration activities. The behaviors of the set of handlers are guided by configuration files.

In some embodiments, the system may map requirements for a first application (e.g., an enterprise resource planning system) running on the first computing system in the first computing environment to requirements for a second application running on the second computing system in the second computing environment. In view of the mapping and the data, the system may then determine the requirement of the first choreography key that is not met by the set of handlers. The first application may control the states of the choreography, which defines a scope of behaviors that need to be implemented in order to communicate with the first entity electronically. The second entity is required to meet the requirements of the first application so as to follow the choreography. In some embodiments, the requirements of the first application comprise disparate data and processing requirements and the disparate data and processing requirements are subject to change from time to time unbeknownst to the second entity.

In some embodiments, the integration activity comprises utilizing the set of handlers for creating a data set conforming to a data model, the data set initially empty; transforming the data from the second entity from a format of the second entity to a format of the first entity; inserting the data thus transformed into the data set conforming to the data model; and changing a corresponding state in the data set. The data set can be utilized by one of the set of handlers to generate and transfer a file.

In some embodiments, the system may stop moving the data through the choreography, which stops or pauses the test mode. The system may then determine, at design time, a handler that can meet a requirement of the choreography key that is not met by the set of handlers and update the workflow implementation to include the handler. After the handler is found, the system may then continue or restart the workflow implementation in the test mode with the handler that can meet the requirement of the choreography key.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 21A-21B illustrate an example of a canonical model represented in a hierarchical form according to some embodiments disclosed herein.

DETAILED DESCRIPTION

Glossary

Figure 1A:
FIG. 1A shows how data may move from one application to another in a transactional process.

EbXML or e-business XML (Electronic Business using eXtensible Markup Language)—refers to a family of XML-based standards that enables the global use of electronic business information in an interoperable, secure, and consistent manner by all trading partners.

Conversation—in ebXML terminology, a conversation is a series of business message exchanges between trading partners that is predefined by a conversation definition and a fundamental step in defining a conversation is creating the workflows that execute the roles (e.g., an initiator role and a participant role). Each workflow template associated with an ebXML conversation performs only one of the two roles. In this disclosure, the term "conversation" takes on a broader meaning because the invention disclosed herein is not limited to trading partners that exchange EDI documents over an electronic information exchange platform. Rather, the invention disclosed herein can be leveraged to facilitate electronic information exchange between entities in a single enterprise and the information thus exchanged is not limited to EDI documents. A conversation typically involves two entities, referred to herein as a rule setter (or a rule-setting entity) and a rule follower (or a rule-following entity). An example of a rule setter can be a buyer or a buying entity. An example of a rule follower can be a seller or a selling entity. Thus, in this disclosure, the term "conversation" can apply to a pair of entities that converse electronically with each other where information as well as transactions are exchanged by sending messages, making application programming interface (API) calls, using the ebXML terminology, and sending signals (e.g., "order received," "order accepted," etc.). A conversation, therefore, can include a transaction and/or signals between a pair of entities. However, communications taking place in a conversation between a pair of entities can involve one or more other entities, for instance, a service provider for a rule-setting entity. These communications do not change the conversation between a single pair of entities into a three-way conversation, although all the entities involved in the conversation must work together to implement a meta workflow.

Meta Workflow—a choreographed workflow of workflows. There can be multiple different entities involved in a meta workflow which, in turn, can involve environment-specific workflows. An environment-specific workflow is a workflow that takes place inside a computing environment of a business entity. For instance, a rule-setting entity can have multiple applications that may work together to implement a workflow inside a computing environment of the rule-setting entity. These applications may communicate outside the computing environment of the rule-setting entity with a reusable integration component of an intelligent integration system disclosed herein.

Reusable integration component—also referred to herein as a "kit" or a "digital avatar" ("avatar"). In this disclosure, an avatar is created by the intelligent integration system disclosed herein as a representative of a computing system of an enterprise (e.g., a buyer, a seller, a supplier, a retailer, an intermediary, etc.) within a computing environment where the intelligent integration system operates. These avatars do not represent humans and are not controlled by humans.

Integration—moving data through automation, e.g., moving data from one entity to another with one or more Applications. The invention provides a reusable integration component that can integrate an entity with one or more entities that have varying data and processing requirements, such that the first can follow the varying data and process conventions of the others. For instance, in a business-to-business (B2B) integration, typically a seller (the first entity) needs to conform to the requirements of buyers (the other entities). An avatar for the first entity can be adapted to variations in the first entity. For instance, users of an application such as an ERP very often customize the ERP, and that customization can affect the data and processes of the ERP. The avatar for the first entity can be adapted to accommodate such a customization. This disclosure alters the focus of integrating with entities from sending files and making API calls to using multiple techniques to construct the data needed by the recipient (and that may involve exchanging file data and making API calls). The integration does not depend on applications to generate the data of a transaction. Rather, the invention constructs the transaction from the available data and pulls only the necessary data from the application.

Choreography—the meshing between business entities and their workflows.

Choreography key—a set of rules that must be followed by avatars involved in a choreography. Inside a workflow, a choreography key helps sub-workflows to communicate meaningfully and collaborate.

Actor—an entity or an avatar. Both a business entity (here called an entity) and an avatar are actors. In this disclosure, an actor involves software and humans and partakes in workflows.

Transaction—business-meaningful data exchange between actors.

Handler—a component of the intelligent integration system. There can be multiple types of handlers. An avatar may make use of a handler in order to implement the requirements of some choreography key that it otherwise could not implement.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

An information exchange platform operating in a network environment has the necessary resources (e.g., hardware, software, personnel, etc.) to provide managed services that enable the real-time flow or exchange of information electronically in the network environment in a secure, fast, and reliable manner, between and among disparate operating units, regardless of their standards preferences, spoken languages, or geographic locations. In this disclosure, an operating unit may represent a company, a corporation, an enterprise, an entity, or a division thereof (which is collectively referred to herein as an "entity"). Examples of a network environment may include a distributed computer network or a cloud-based computing environment. Non-limiting examples of managed services may include translation services, format services, copy services, email services, document tracking services, messaging services, document transformation services (for consumption by different computers), regulatory compliance services (e.g., legal hold, patient records, tax records, employment records, etc.), encryption services, data manipulation services (e.g., validation), etc.

The information exchange platform operates to facilitate the real-time flow or exchange of information between disparate entities regardless of standards preferences, spoken languages, or geographic locations. The information exchange platform may be embodied on server machines that support the electronic communication method (e.g., EDI, API, etc.) used by various computers (i.e., client systems of the information exchange platform) that are independently owned and operated by different entities. In some embodiments, data formats supported by the information exchange platform may include EDI, XML, ebXML, RosettaNet, EDI-INT, flat file/proprietary format, etc. Supported network connectivity may include dial-up, frame relay, AS2, leased line, Internet, etc. Delivery methods supported by the information exchange platform may include store-and-forward mailbox, event-drive delivery, etc. Supported transport methods may include Hypertext Transfer Protocol (HTTP), File Transfer Protocol (FTP), and Simple Mail Transfer Protocol (SMTP), etc. Network security protocols supported by the Trading Grid may include Secure Socket Layer (SSL), Secure/Multipurpose Internet Mail Extensions (S/MIME), Internet Protocol Security (IP-SEC), Virtual Private Network (VPN), Pretty Good Privacy (PGP) encryption protocol, etc.

An intelligent integration system disclosed herein may leverage the information exchange platform to enable choreographed entity-to-entity conversations. As alluded to above, a business entity (e.g., an enterprise, a corporation, a division in a company, or some other collaboration of people making using of software applications and automation as part of their business) may follow conventions for achieving a particular goal. This orchestrated or choreographed pattern of activity is referred to a workflow. When two or more business entities collaborate, the workflows of each business entity must mesh to some degree. In this disclosure, the meshing between business entities (and their workflows) is referred to as a choreography. Thus, there can be workflows within workflows: an application used by a business entity has a workflow composed of the application and the people who use it; when people utilize two or more applications to achieve a purpose, they form a new workflow composed out of smaller, application-centric workflows; and now when business entities collaborate, a new meta workflow is formed out that utilizes workflows within the business entities.

FIG. 1A shows that, in the space of integration providing support for a business process which moves data from one application to another (e.g., the order to cash process, submitting and handling an insurance claim, and thousands of others), usually one of the applications controls moving from one state of the choreography and provides the majority of the data for transactions. This is true whether the integration conveys the information of process steps through messages or through APIs.

Figure 1B:
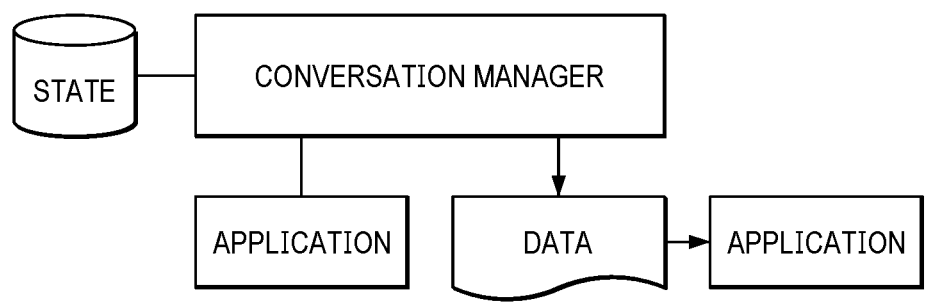
FIG. 1B shows how a conversation manager can guide movement of data from one application to another when an entity follows a workflow by the rules of another entity, according to some embodiments disclosed herein.

In some cases, participants in a business process may not have an application that allows it to anchor the implementation of the business process. Previously, this is solved by modeling the business process so that humans can be the primary implementers of the business process by using a UI. This invention extends this previous solution in a novel way to itself drive the implementation of the process for machine-to-machine communication. As illustrated in FIG. 1B, if an entity is following the business process of another (e.g., having a conversation with another entity), the invention models the business process and, through a conversation manager, guides one to more easily follow the workflow by the rules of the other. In the example of FIG. 1B, the controlling Application, which is part of the rule-setting entity, can be customized. The Application(s) of the rule-following entity are part of the rule-following entity, and may also have varying requirements that the rule-setting entity is required to meet.

As workflows are combined into larger workflows, there can be a proliferation of choreographies. Each choreography follows rules, which are referred to as a choreography key. A ballet involves symbols—a leap into the air might illustrate strong emotion—and the more the audience understands the symbols, the performance shifts from people moving around on stage doing impressive things into communication from the performers to the audience. Likewise, inside a workflow, the choreography key helps sub-workflows communicate meaningfully and collaborate. In addition, some entity needs to define the choreography key and often one of the business entities defines the choreography key to fit its workflows and then expects other business entities to conform to that choreography key.

It is often the case that two business entities find that their workflows do not have a simplistic meshing and so one entity has to conform to the choreography key of the other. This can be challenging. To this end, the intelligent integration system provides an avatar as a digital representative of a business entity that reflects the choreography required by the business entity in order to succeed with other choreographies. Thus, an avatar has its own sub-workflow and follows two or more conversation keys. An avatar may make use of a handler in order to implement the requirements of some choreography key that it otherwise could not implement. Both a business entity (here called an entity) and an avatar are actors. In this disclosure, an actor involves software and humans and partakes in workflows. An actor participating in a choreography can invoke an activity in response to data arriving from another actor, to prepare data for another entity, and for other purposes. The term "transaction" is used here to describe business-meaningful data between actors. The choreography key defines the rules around data format, sequencing, etc. for transactions.

Figure 2A:
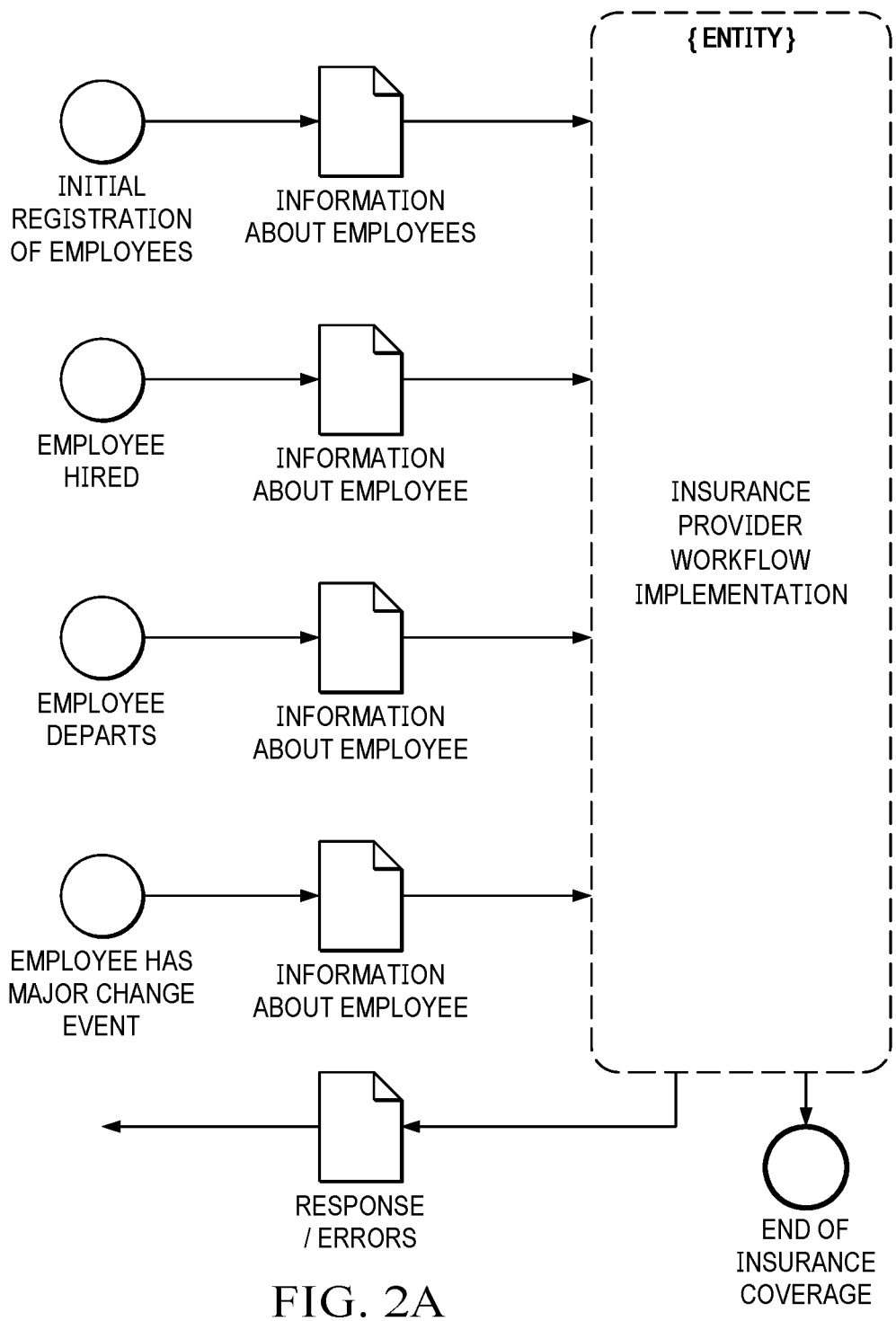
FIG. 2A shows a non-limiting example of a workflow implementation in a first computing environment, identified by {Entity} in FIG. 2A, which can include an entity (e.g., any business entity), avatar, handler, and choreography, according to some embodiments disclosed herein.

FIG. 2A shows a non-limiting example of a workflow implementation in a first computing environment, identified by {Entity} in FIG. 2A, which can include an entity (e.g., any business entity), avatar, handler, and choreography. In the example of FIG. 2A, the business entity is an insurance provider that performs services for other companies through a workflow. This entity expects to be informed when any of the entity's customers hires a new employee. If an employee of a customer departs or has a child, the entity expects to be notified, as well as receiving signals such as status and error information.

Figure 2B:
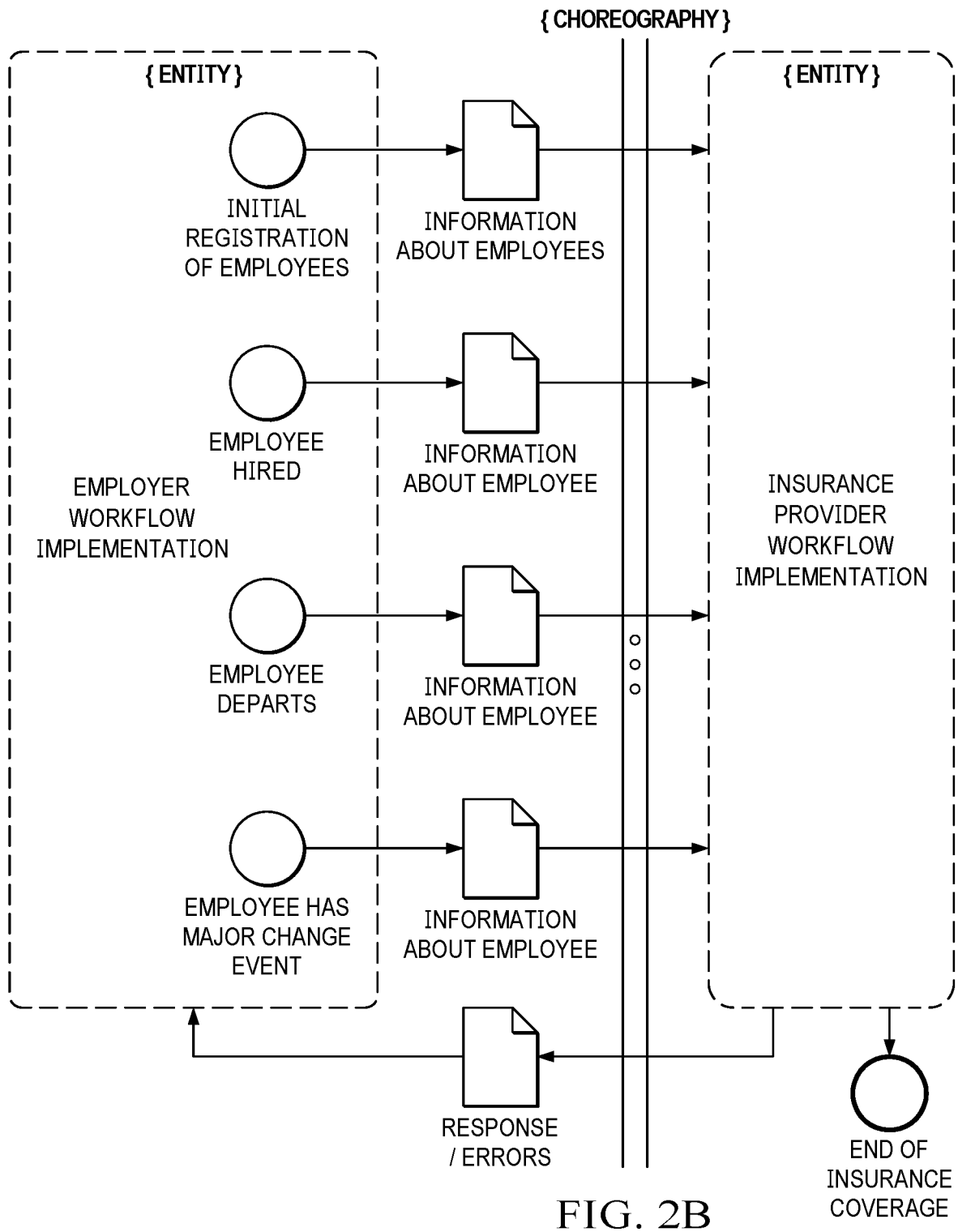
FIG. 2B shows that the customer of the entity shown in FIG. 2A also has its workflow, and that together they need to implement a new workflow so that the entity can provide its services to the customer, according to some embodiments disclosed herein.

FIG. 2B shows that the customer of the insurance provider also has its workflow, and that together they need to implement a new workflow so that the insurance provider can provide its services to its customer (referred to as the employer in the example of FIG. 2B). As illustrated in FIG. 2B, events described above form a choreography that involves both entities.

In the example of FIG. 2B, the employer could follow the insurance provider's choreography. Likewise, if the insurance provider could easily implement the employer's choreography, the choreography could be moved to be next to the employer. However, in practice, it is rare that two choreographies—one for the insurance provider, and one for the employer—align perfectly. Almost always something needs to happen in the middle between the two choreographies.

Figure 3:
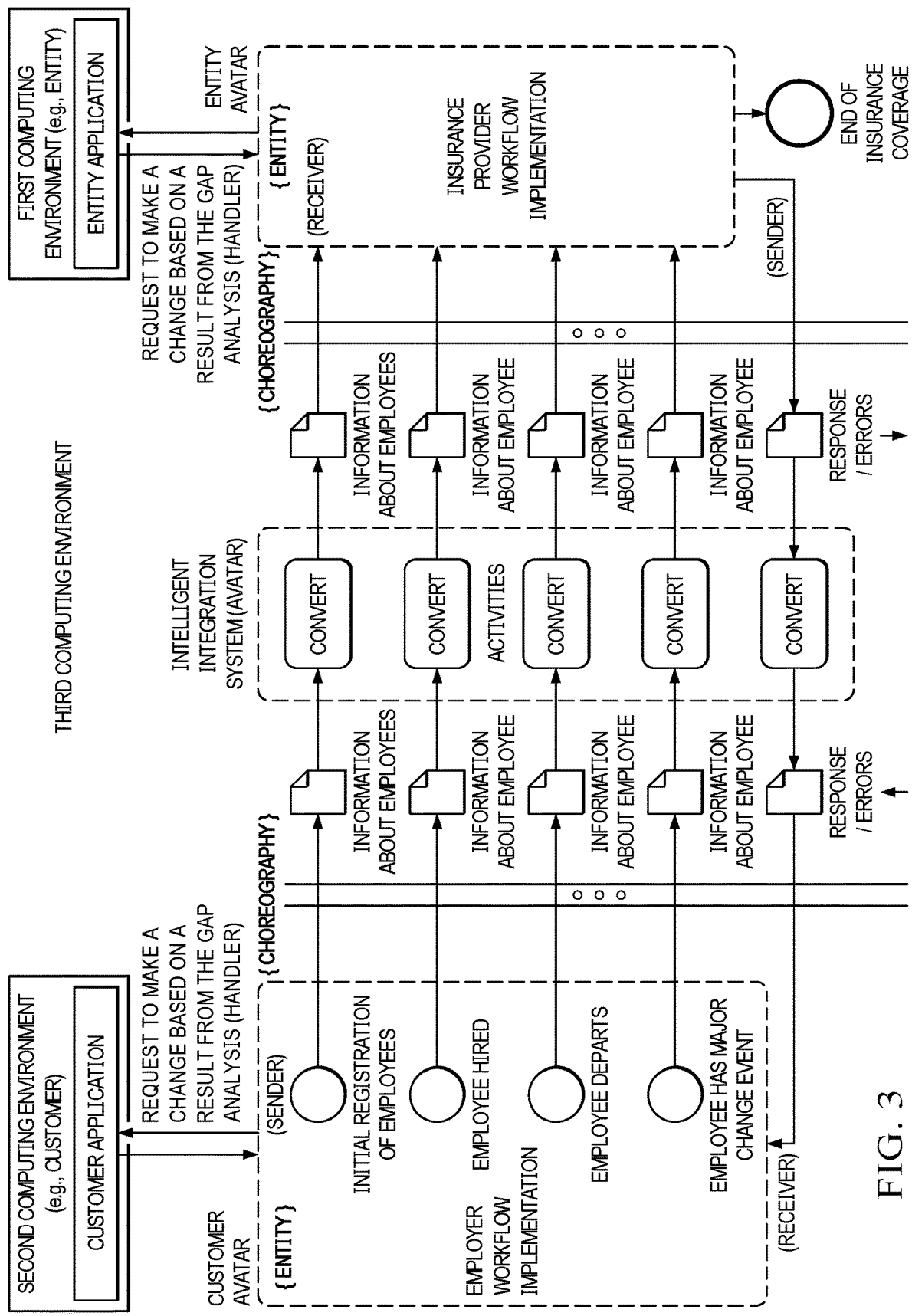
FIG. 3 illustrates an example of an intelligent integration system using a workflow composed of activities to convert the data of a transaction between external systems, according to some embodiments disclosed herein.

FIG. 3 illustrates an example of "something in the middle" (e.g., an intelligent integration system disclosed herein) using a workflow composed of activities to convert the data of a transaction. The intelligent integration system operates in a third computing environment (which can be separate and/or independent of the first computing environment where a computing system of the entity operates as well as the second computing environment where a computing system of the customer of the entity operates). The intelligent integration system includes a conversation manager (see, e.g., FIG. 2) and a set of handlers, which can be adaptive at runtime.

For instance, if the insurance provider consistently gets spreadsheet data from employers, the intelligent integration system can convert the spreadsheet data into the data format required by its own choreography key. While not all "somethings in the middle" normalize data, they all have activities. In this example, the spreadsheet or other data moving through a choreography is defined and governed by the choreography key.

Figure 4A:
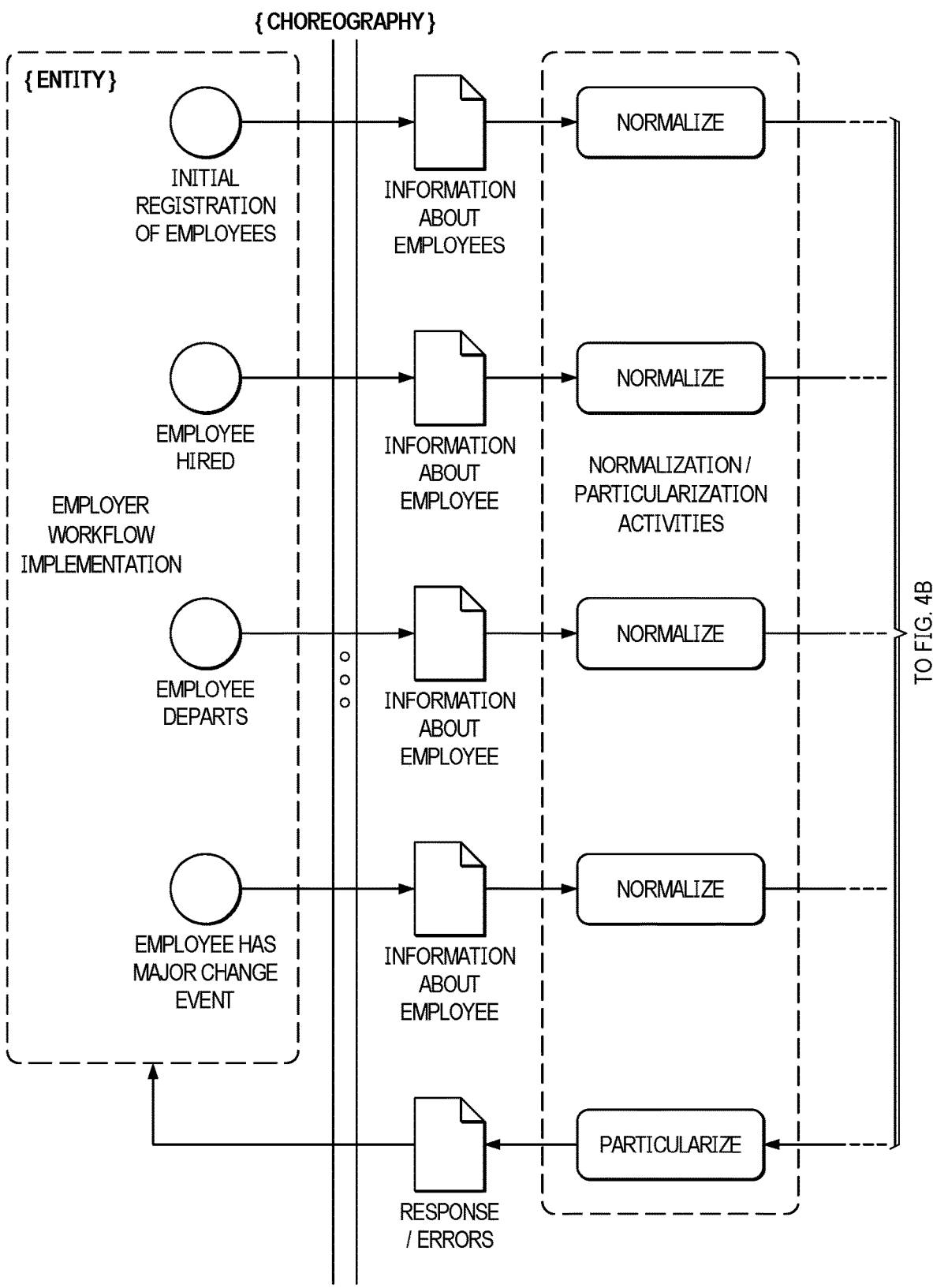
FIGS. 4A-4B illustrate an example of an intelligent integration system having its own choreography that collaborates with multiple other choreographies through normalization and particularization, according to some embodiments disclosed herein.
Figure 4B:
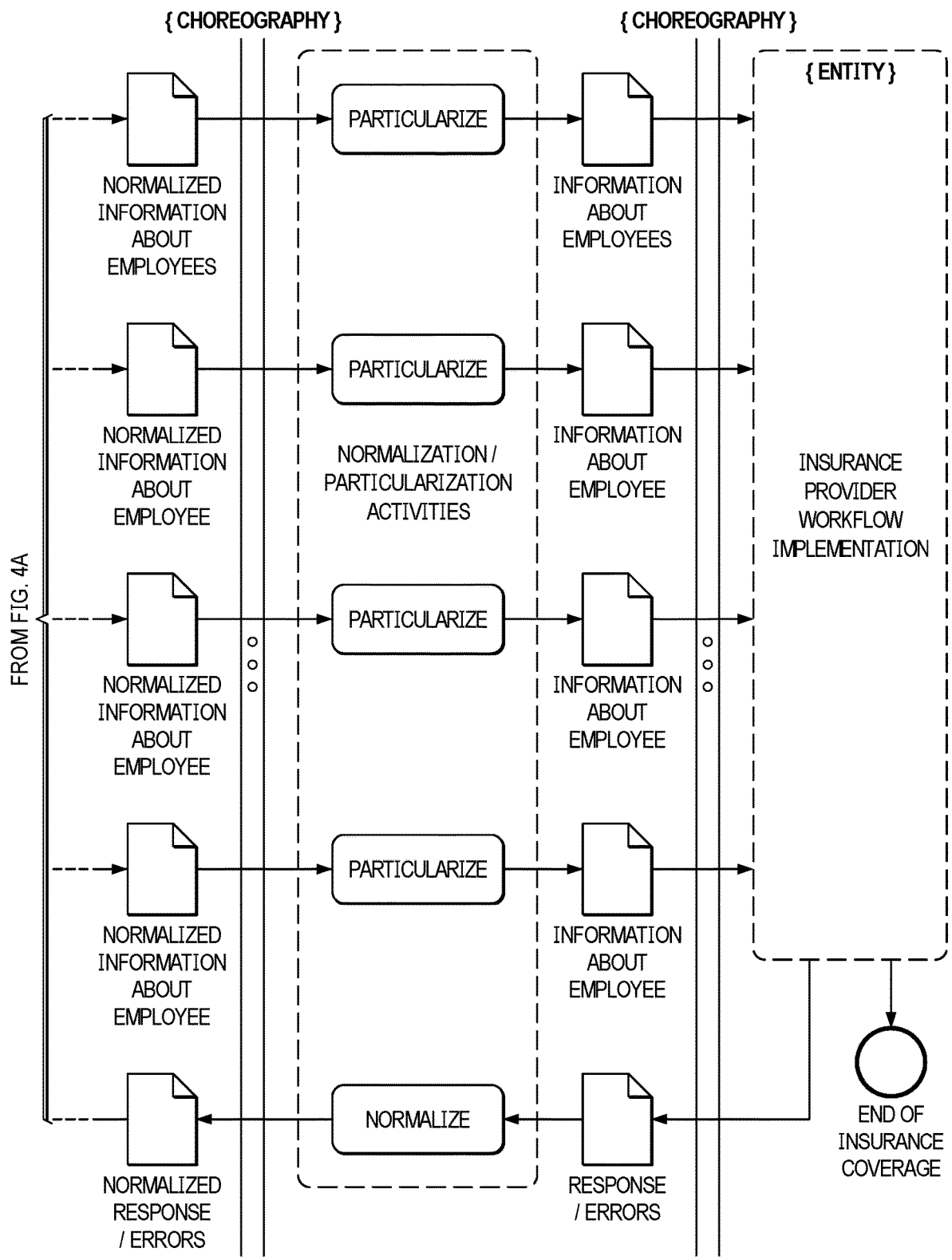

When a single choreography collaborates with multiple other choreographies, is often less effort to use activities that convert transactions into a normalized representation and then convert that data into the transaction required by the recipient choreography key. Converting transactions into the normalized form can be called normalization and converting from the normalized form into a transaction can be called particularization. This approach produces an additional choreography composed of the normalized data representation, as illustrated in FIGS. 4A-4B.

Figure 5A:
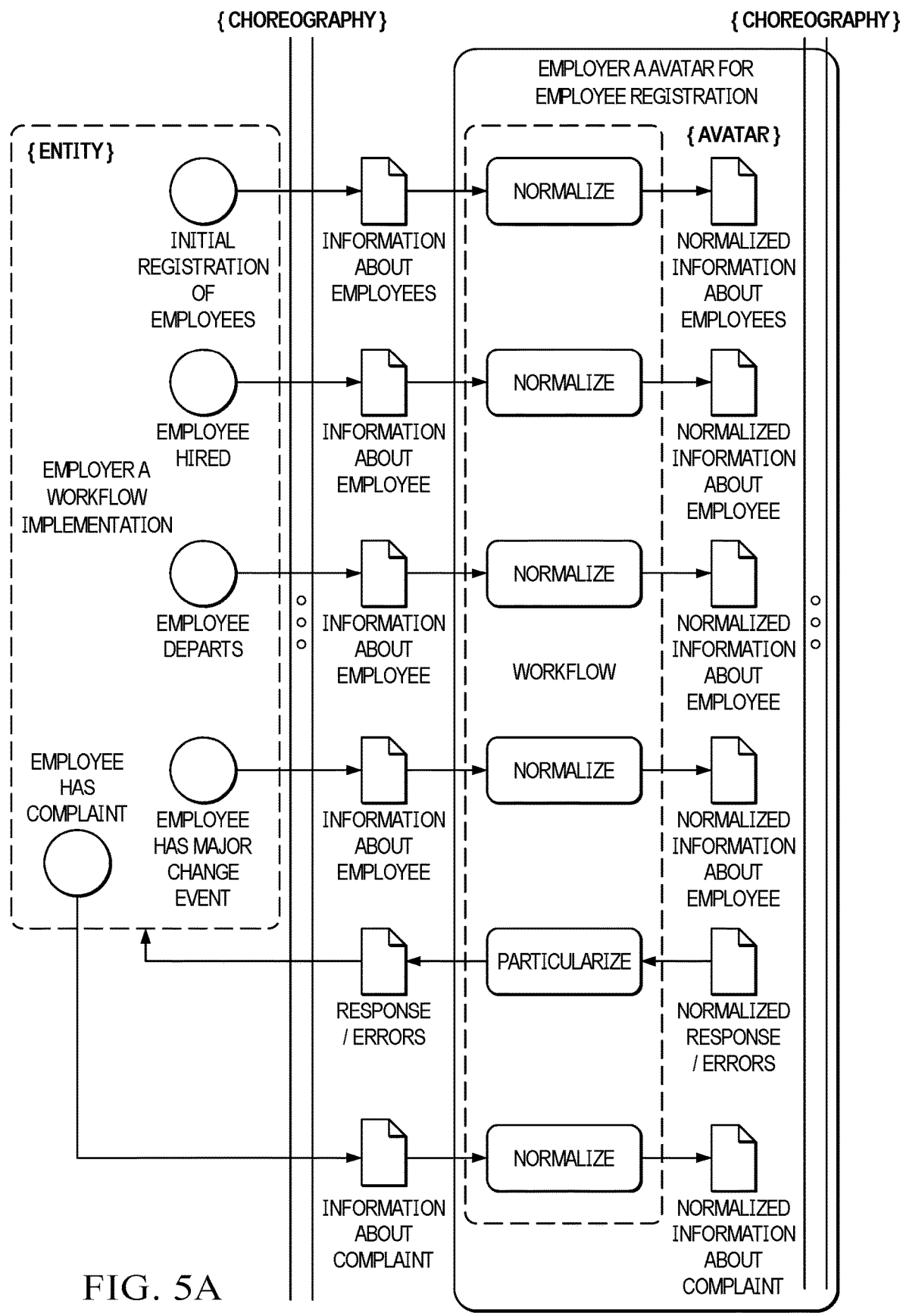
FIGS. 5A-5B illustrate how avatars converse with one another on behalf of entities and respective choreographies, according to some embodiments disclosed herein.
Figure 5B:
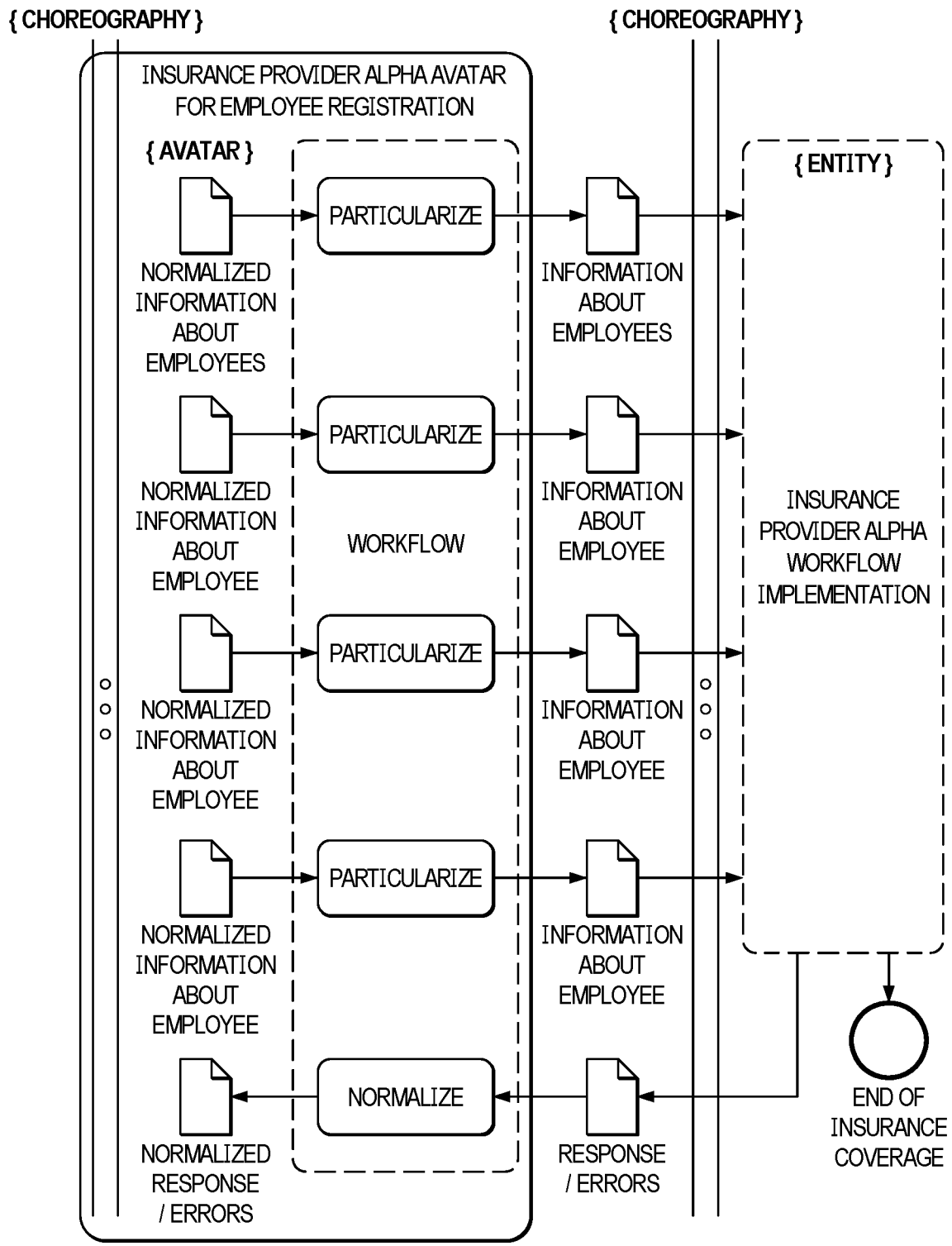

FIGS. 5A-5B illustrate how avatars converse with one another on behalf of entities and respective choreographies. In the example of FIGS. 5A-5B, the insurance provider and the employer each have an avatar representing its choreography. Each avatar can then be governed independently as long as each maintains compatible choreography keys. Thus, there are four actors that together implement a workflow allowing the two business entities to collaborate. Each business entity has its own independent workflow, and each avatar has a workflow that represents the workflow of its entity.

Figure 6A:
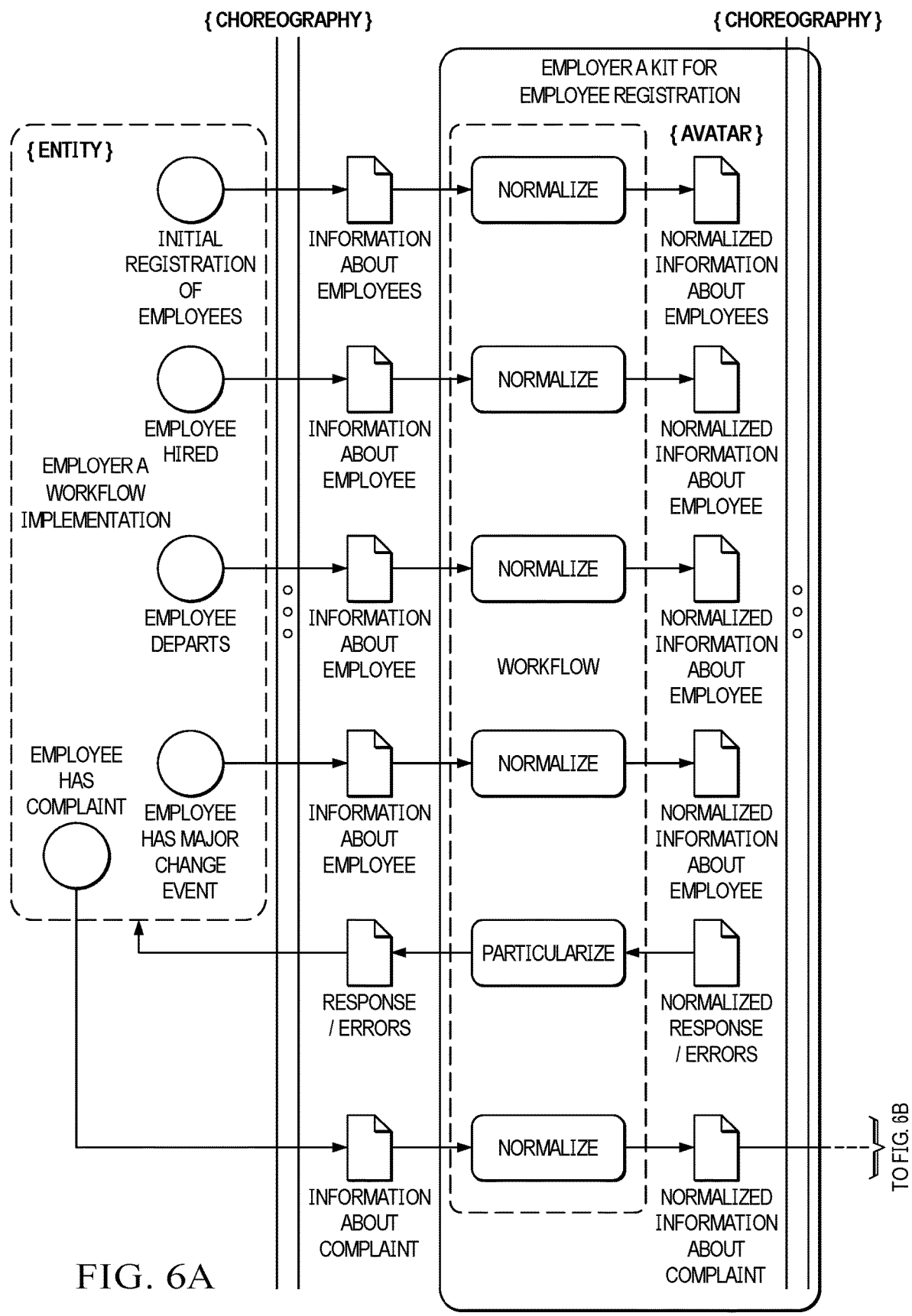
FIGS. 6A-6B illustrate an example of how an entity's avatar may select and invoke a handler that can meet the requirements of a conversation key, according to some embodiments disclosed herein.
Figure 6B:
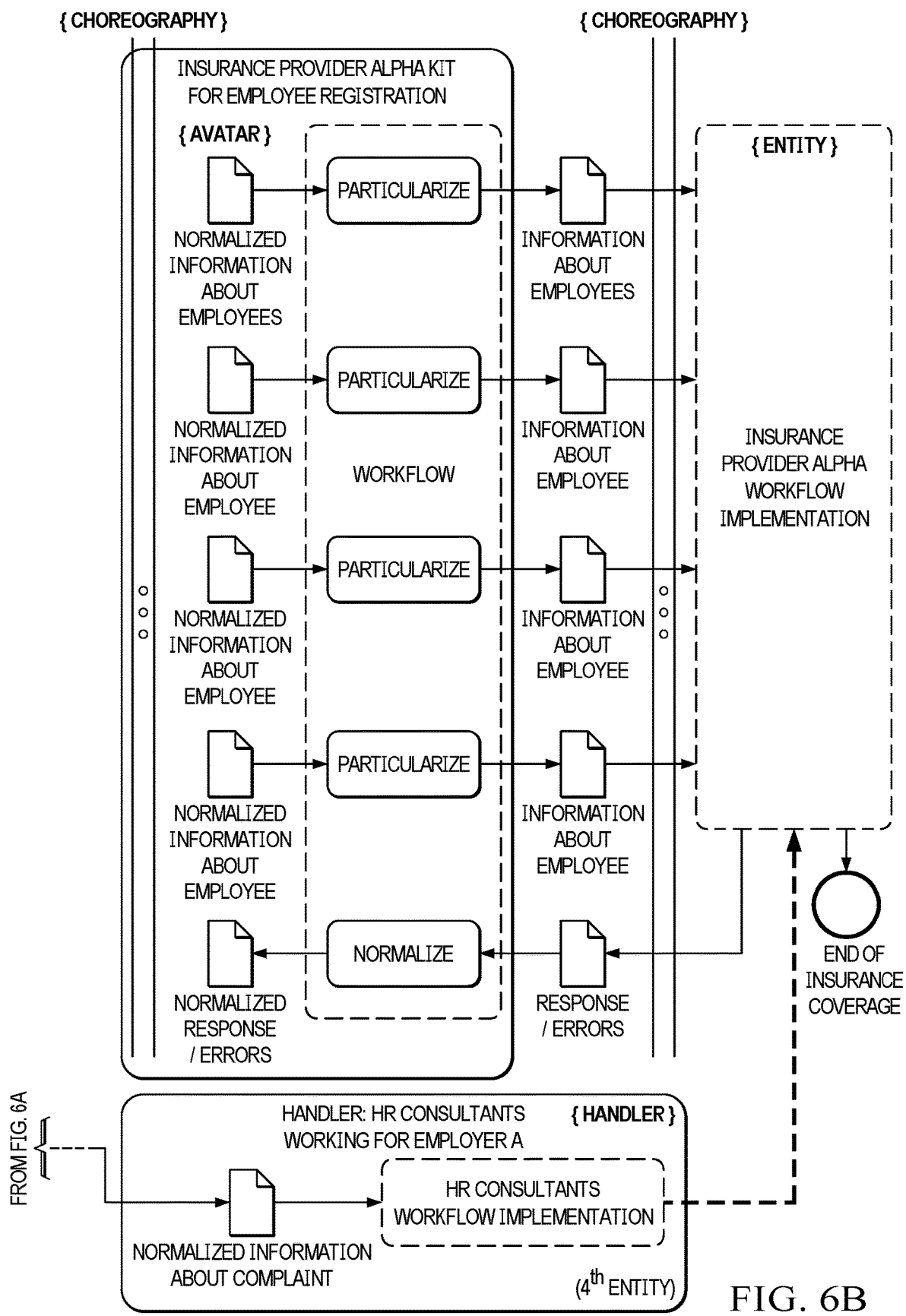
Figure 7:
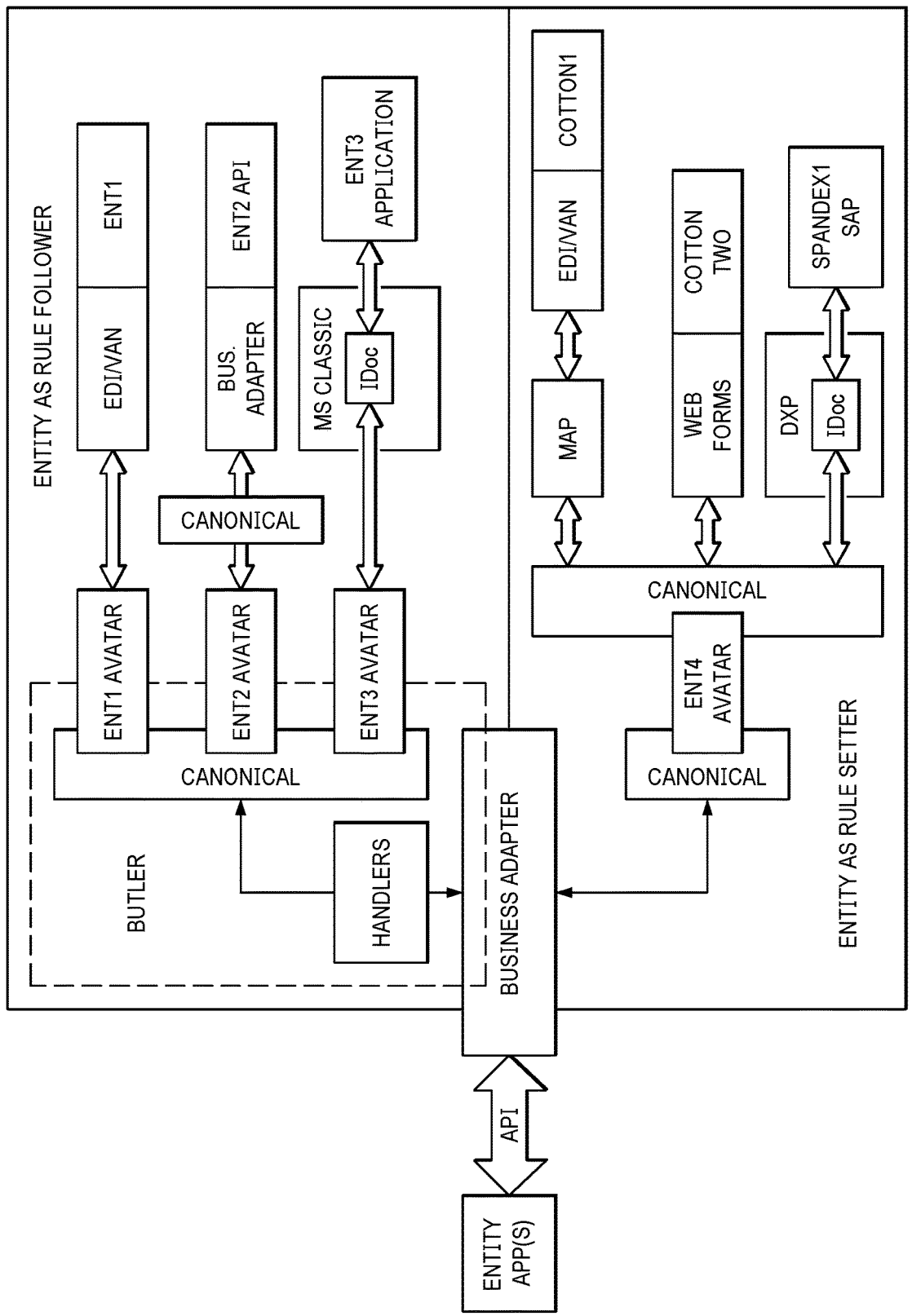
FIG. 7 is a block diagram showing an example operation of a data map converter accordingly to some embodiments.

Following the example of FIGS. 5A-5B, suppose that the employer's avatar expects to send information about complaints, but the choreography key of the insurance provider cannot handle receiving complaints. That is, in this case, a sender (the employer) requires a receiver (the insurance provider) to take a certain action. In such a situation, as illustrated in FIGS. 6A-6B, the employer's avatar may select and invoke a handler that can meet the requirements of the employer's avatar's conversation key. However, these requirements cannot be met by the insurance provider's avatar's conversation key. The employer may determine to address the gap (e.g., by utilizing a $4^{th}$ entity such as an HR consultant to normalize complaint data and provide the normalized complaints to the insurance provider's avatar), but the gap could also have been filled by the insurance provider. As illustrated in FIG. 7, acting as a rule follower, an entity may need to follow different requirements in communicating with different entities (e.g., Entity 1 via EDI, Entity 2 via API, Entity 3 via application). Acting as a rule setter, the same entity can specify what it requires others to follow.

These avatars formalize the idea of an actor that can mimic and represent the interests of another actor. This approach involves formalizing interactions between actors via choreography keys, hereinafter referred to as signatures.

Figure 8:
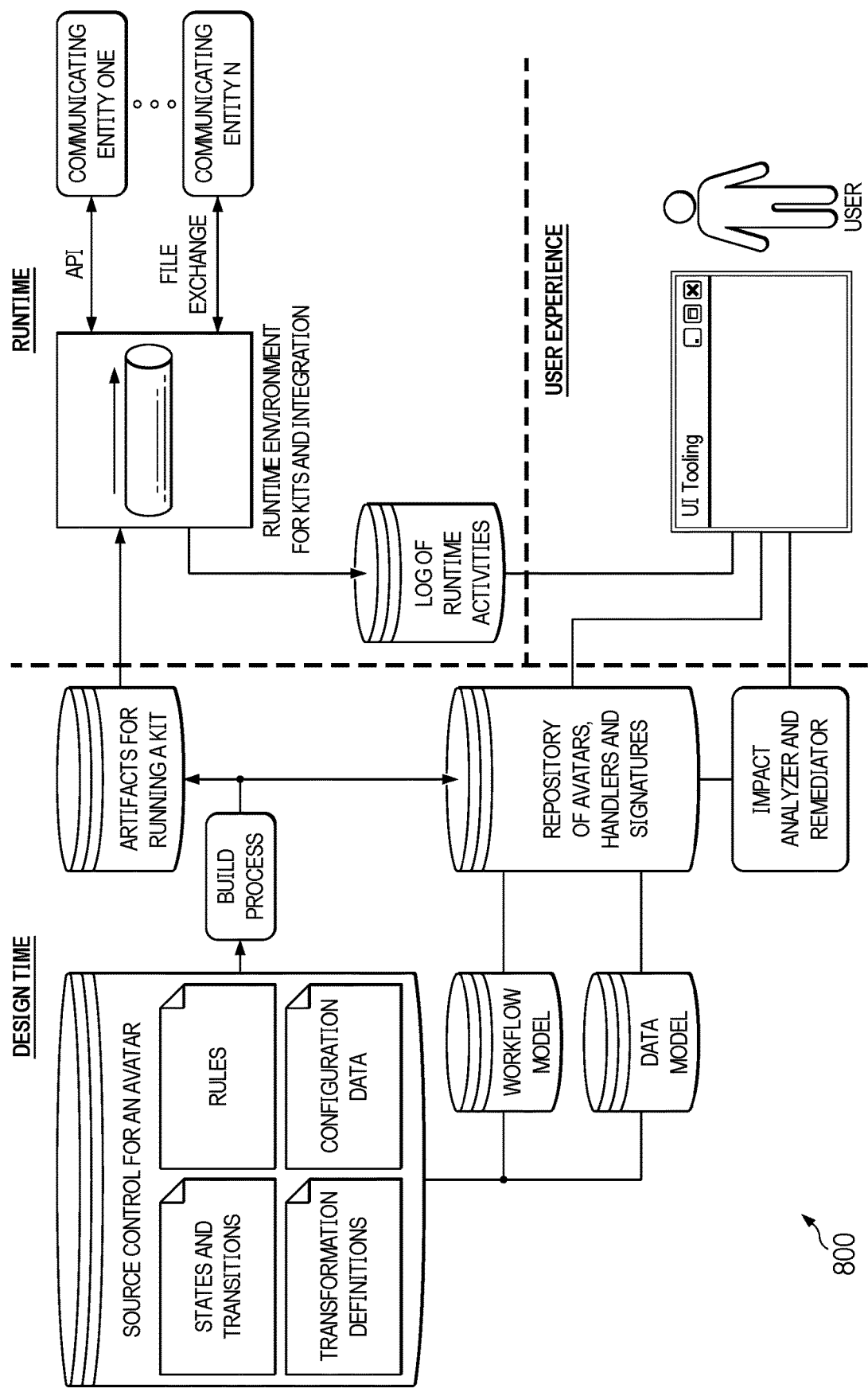
FIG. 8 is a diagrammatic representation of an example of an intelligent integration system according to some embodiments disclosed herein.
Figure 9:
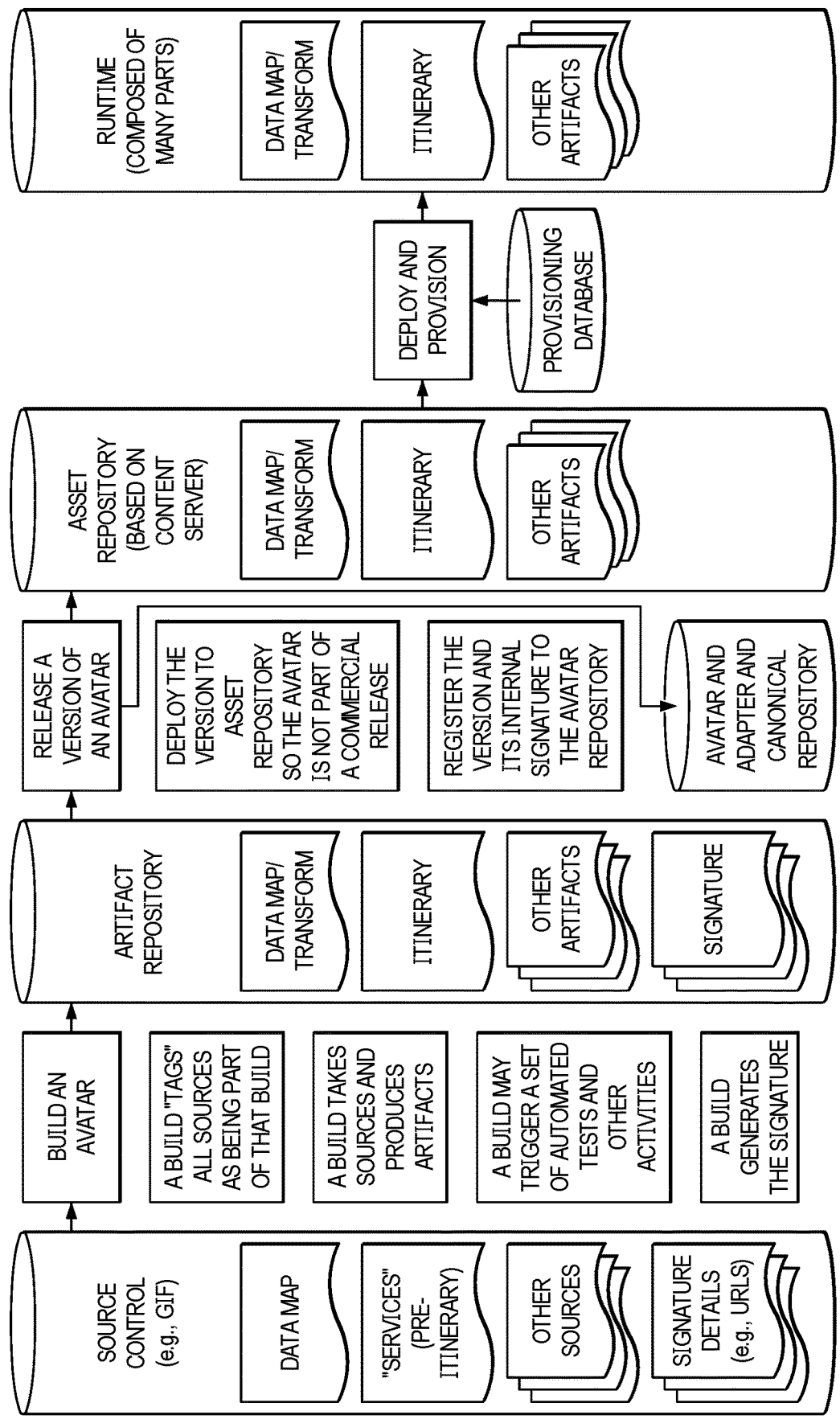
FIG. 9 is a diagrammatic representation of design time components and runtime components of an example of an intelligent integration system according to some embodiments disclosed herein.

FIG. 8 is a diagrammatic representation of an intelligent integration system 800 according to some embodiments disclosed herein. In this example, intelligent integration system 800 comprises design time components and runtime components. As illustrated in FIG. 9, at design time, avatars, handlers, and signatures are created and stored. There can be multiple types of handlers and signatures. At design time, the system can run a gap analysis to determine what handler(s) a rule follower needs in order to meet the requirements of a rule setter. At runtime of a workflow implementation (e.g., in a test mode or a test mode that mimics a production mode), the system can get the missing handler and whatever else is needed, e.g. states/transition data items. In a production mode, such a handler can be used (in addition to other handlers already involved) when a change event is required in order to work with an additional avatar, when the requirements of an avatar change, or when the requirements of integrating with an application change. Before describing further, it may be helpful to discuss what a state is and how a state can be missing.

A state indicates the status of a conversation. The actions taken during the conversation bring the conversation to states and each state indicates the next actions that can be taken. Thus, there needs to be one or more automated or human entities that can take responsibility for the next step (except for end states, which might not have a next step). Table 1 below shows some example states and the entities that can trigger the next step:

TABLE 1

| State | Prior | Indicates |
|---|---|---|
| Waiting for Response for Price of Insurance | An insurance agent sent a request for a price to an insurance company on behalf of a customer | Waiting for the insurance company to respond within 24 hours. Exit criteria include: Insurance company responds 24 hours pass with no response Customer cancels the request |
| Waiting to Ship | Negotiations completed and the seller is preparing to ship the purchased goods | Waiting for the seller's application to indicate that shipment has happened. Exit criteria include: Notification that shipment sent Buyer cancels Delay in shipping that requires notifying the buyer |
| Waiting for Approval to Treat a Patient | Medical provider has submitted request to insurance company to provide treatment for a patient with a non-emergency issue | Waiting for approval from the insurance company and exit criteria include: Approval received from insurance company Request for more information received from insurance company Patient's condition changed and new information is provided to the insurance company Patient dies (and so request is cancelled) The request times out because the insurance company has not responded in the agreed-upon timeframe |

Using the last example, the Waiting for Approval to Treat a Patient state, the entities in the conversation are:

Medical provider

Insurance company

System component (e.g., a conversation manager) that is tracking the conversation and can alert the other parties that the Service Level Agreement has not been met and that the request has been voided In this case, the patient is in the conversation, but is not an active participant in this state. Thus, being able to conduct a conversation requires that one or more entities take responsibility for the exit criteria of all states except end states.

For instance, in the Waiting for Approval to Treat a Patient, the system component could be the only participating entity taking responsibility, thus ensuring that the "Approval received" transition from the state will never occur, and that additional configuration information would be needed to ever conduct a successful conversation. For instance, the system component could provide a user interface (UI) so that human users who are part of the Medical Provider or Insurance Company can trigger the actions for exiting the state.

Being able to successfully conduct (e.g., through a conversation manager of the system) a conversation requires that the necessary entities are all engaged and are able to trigger the exit criteria. Since the focus of the invention is how to enable automation, the attention is now directed to how handlers can be identified, registered, and utilized.

Foundational to the invention is having a set of known states. Then the signature of a handler for a state is: (state, data-in, criteria, data-out, endpoint):

state: the state, which is one of the known states data-in: the data element & structure of the data the handler needs to enter the state criteria: any rules on the data-in that indicate whether the handler is able to participate in the state data-out: any response from the handler, such as if the application etc. behind the handler rejecting entering the state any information about an API call, URL, etc. needed for the handler to interact with outside resources to enter the state Examples of handlers for state transitions, including missing state transitions, include:

Send a SMS message each time a certain kind of transaction is received. This handler can be triggered each time the state is entered and thus has a post state.

Send email alerts when in the Waiting for Response for Price of Insurance state (see above) and the request is 12 hours, 6 hours, and 1 hour from timing out. This handler does not alter the state—which is very similar to saying that the prior and post state are the same.

Generate and send a transaction to an endpoint upon receipt of a notification to exit a state. This handler might send an invoice once the data for an invoice is available and all conditions for sending the invoice are met.

The signature is: (pre-states, post-state, data-in, criteria, data-out, action, endpoint), where pre-states is the set of states prior to the action post-state is the state that can be the new states once the handler is invoked action is what to do, such as to run a script, when the handler is invoked If a post-state but no pre-state is indicated, then the handler will be invoked each time the state is entered. If one or more pre-states are present but no post-state, then the handler will be invoked each time a state in the pre-states is exited.

For missing data, a handler can acquire missing data and provide data as needed. For instance, if a state transition can occur once three additional pieces of data are available, one or more data handlers can be used to acquire that data. Data handlers include:

Place a request for data into a queue so that a human provides the needed data

Make an API call to an application to look up data values

Place a request on a queue and wait for a data file to appear on disk in order to retrieve the needed data Missing data handlers to not indicate a target state, but may be used to provide data for another handler to enable it to have sufficient data-in. Similarly, a data handler may be used to record data, such as might be required by a state transition handler.

Figure 10:
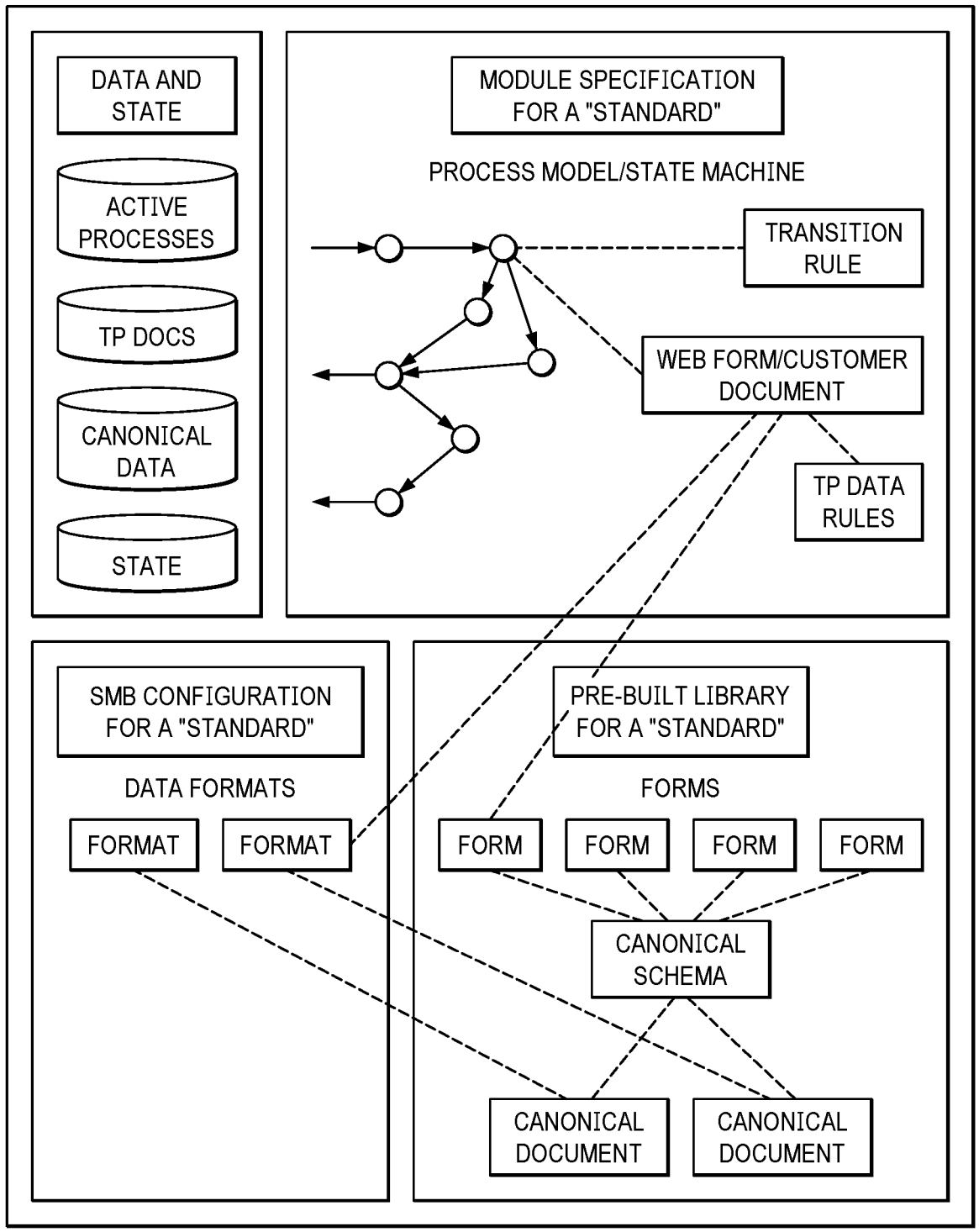
FIG. 10 is a diagrammatic representation of an example of an intelligent integration system with a pre-built library for creating a standard avatar according to some embodiments disclosed herein.

The signature is: (states, data-in, criteria, data-out, action, endpoint), where states are a set of states in which this handler can be used data-in often indicates query conditions, such as a document identifier, that can be used to fetch the necessary values As alluded to above, an avatar is a reusable integration component (or module) of the intelligent integration system disclosed herein. As illustrated in FIG. 10, a system 1000 can include a pre-built library for building a "standard" avatar (a "standard"). At design time, a data model schema, library of forms, and other reusable artifacts can be used to build modules for a "standard." A module specification for a "standard" specifies how other entities can correctly interact with this entity and includes maps between the entity and canonical data.

Figure 11:
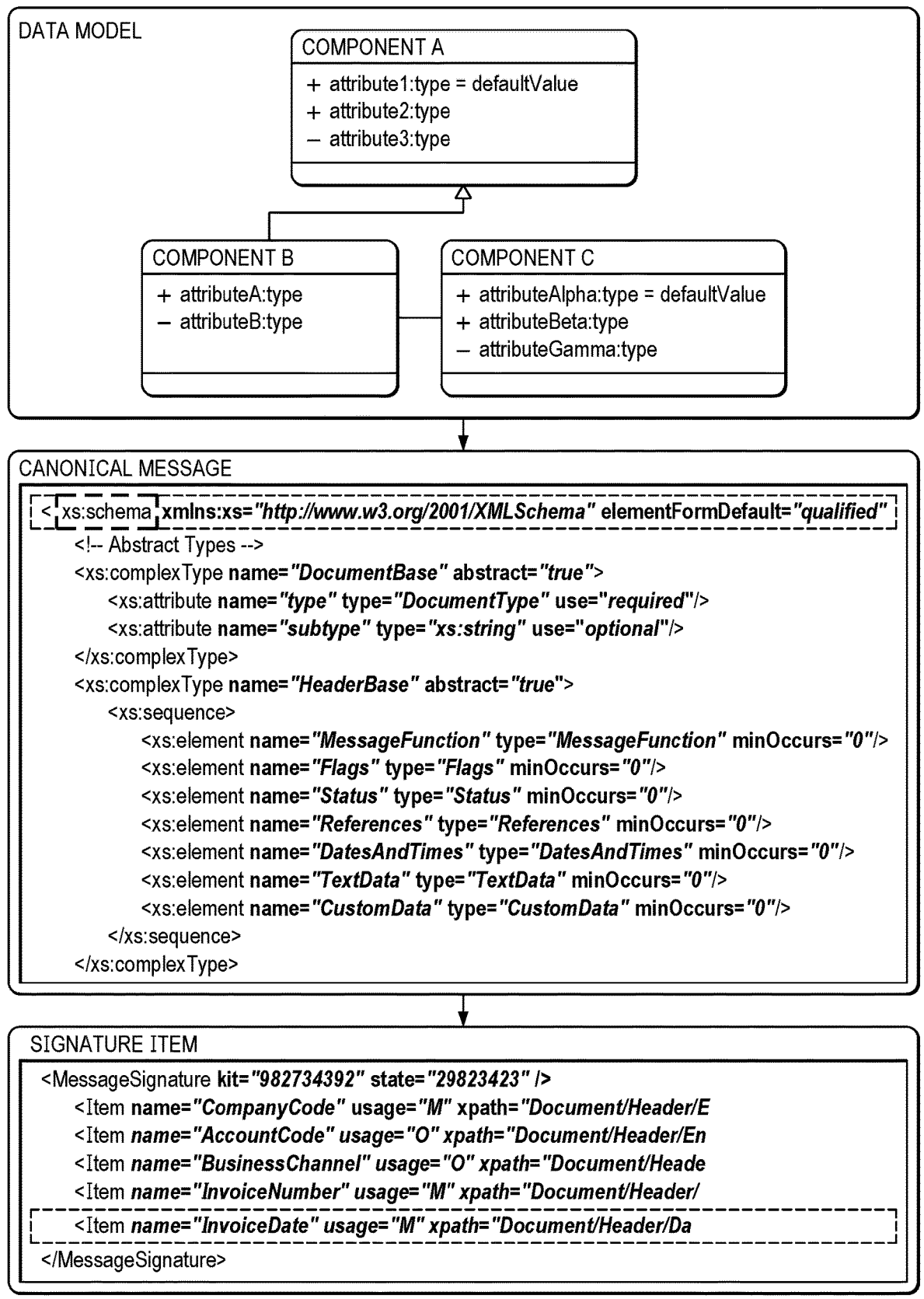
FIG. 11 shows an example of a data model, an example schema of a canonical message, and an example of a signature item according to some embodiments disclosed herein.

In the terminology of FIG. 10, a small business (SMB) configuration for a "standard" specifies how to interact with a given entity. The data and state component has all the necessary information about the entity that uses an avatar. FIG. 11 shows an example of a data model, an example of a canonical message, and an example of a signature item.

In the example of FIG. 10, an avatar or module comprises the configuration for working with a business entity (e.g., a buyer, a seller, etc.) in a specific industry and region (a "standard" in the terminology of FIG. 10). In this context, an avatar comprises:

A data model ("canonical" in FIG. 10) for that "standard" that holds the cumulative data needed for a business process (e.g., for the choreography that starts once an order arrives from a buyer)

Transactions (e.g., purchase orders, invoices, insurance registrations, and so on)

Set of states (e.g., the buyer sent an order, but it has not been acknowledged) and rules for transitioning between states (e.g., the supplier is acknowledging the order) organized into a state machine Requirements on the data for each buyer and state, that configure what canonical data items appear in web forms and what data requirements need to be met in order to transition between states Validation business rules to guide the user and to protect from sending bad data UI forms for the different process steps and transactions In addition, the system provides a powerful "enrichment service" that enables autofill. For instance, if a prior transaction in a choreography (such as an order transaction that triggers a business process) contains a piece of data that is needed in a later transaction (e.g., a shipment notice transaction), the system "auto-fills" that data on the UI form. This powerful capability is based on the transactions and the cumulative data of a business process held in the canonical data model, and can be leveraged by the modules.

Figure 12:
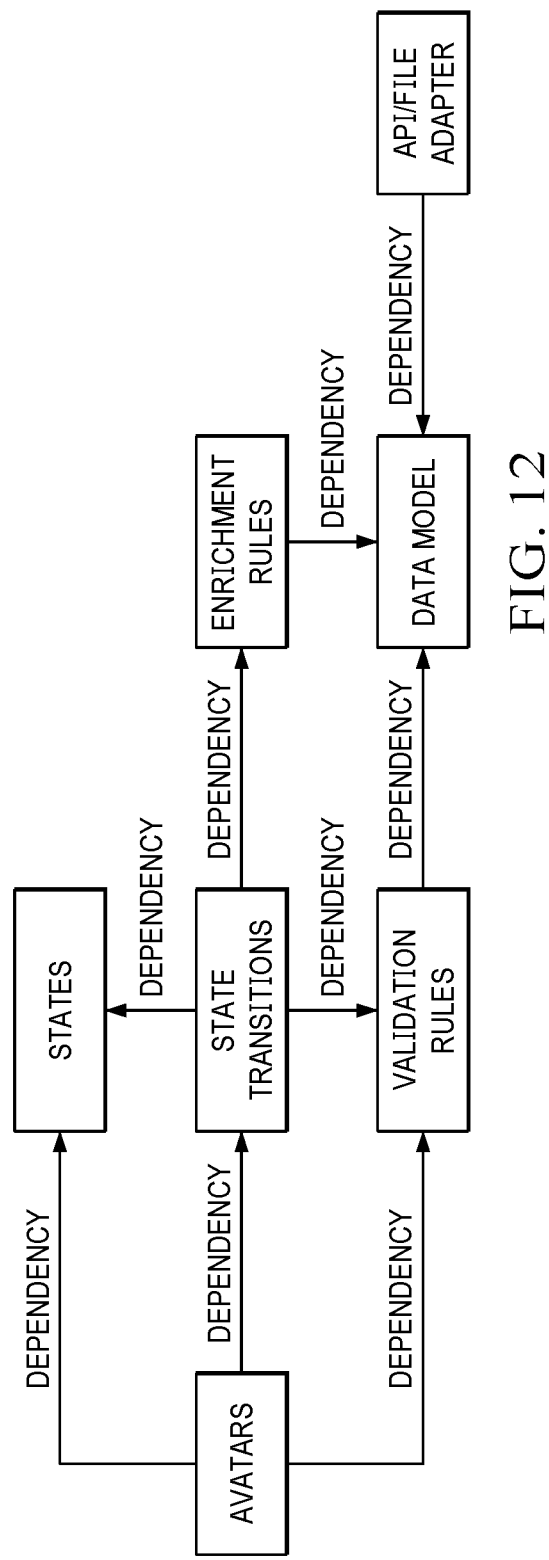
FIG. 12 diagrammatically shows the relationship between items in a library for building avatars according to some embodiments disclosed herein.

FIG. 12 diagrammatically shows the relationship between items in the library. As illustrated in FIG. 12, the states and the data model are the basic pieces that bind all the rest together.

Figure 13:
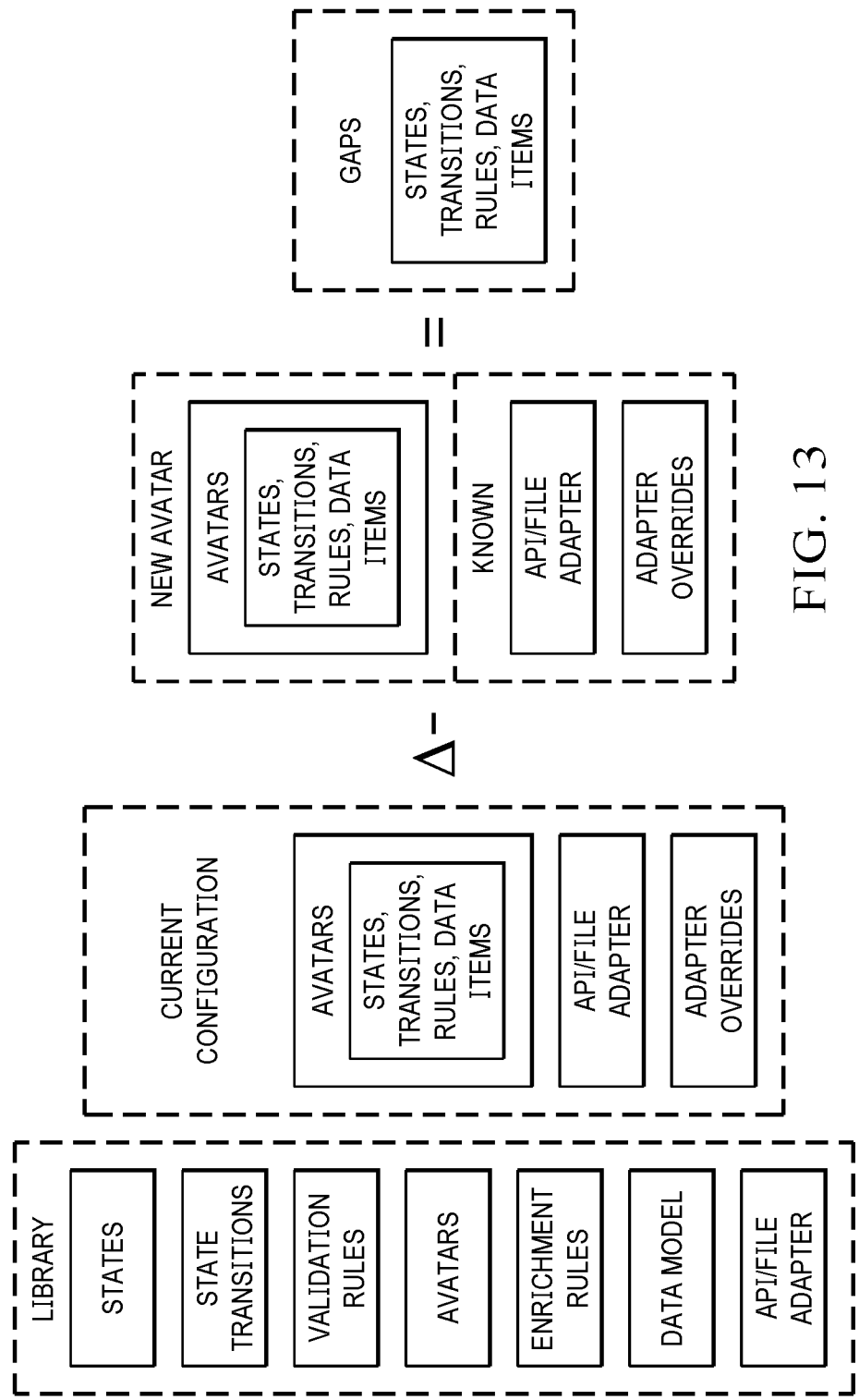
FIG. 13 shows an example of a gap analysis according to some embodiments disclosed herein.

FIG. 13 shows how a library of hub avatars and the current configuration of a customer supporting some e in E can be the basis of computing what is missing when new hub avatars are desired. This shows a delta (Δ) operation, which represents gaps that need to be addressed.

Figure 14:
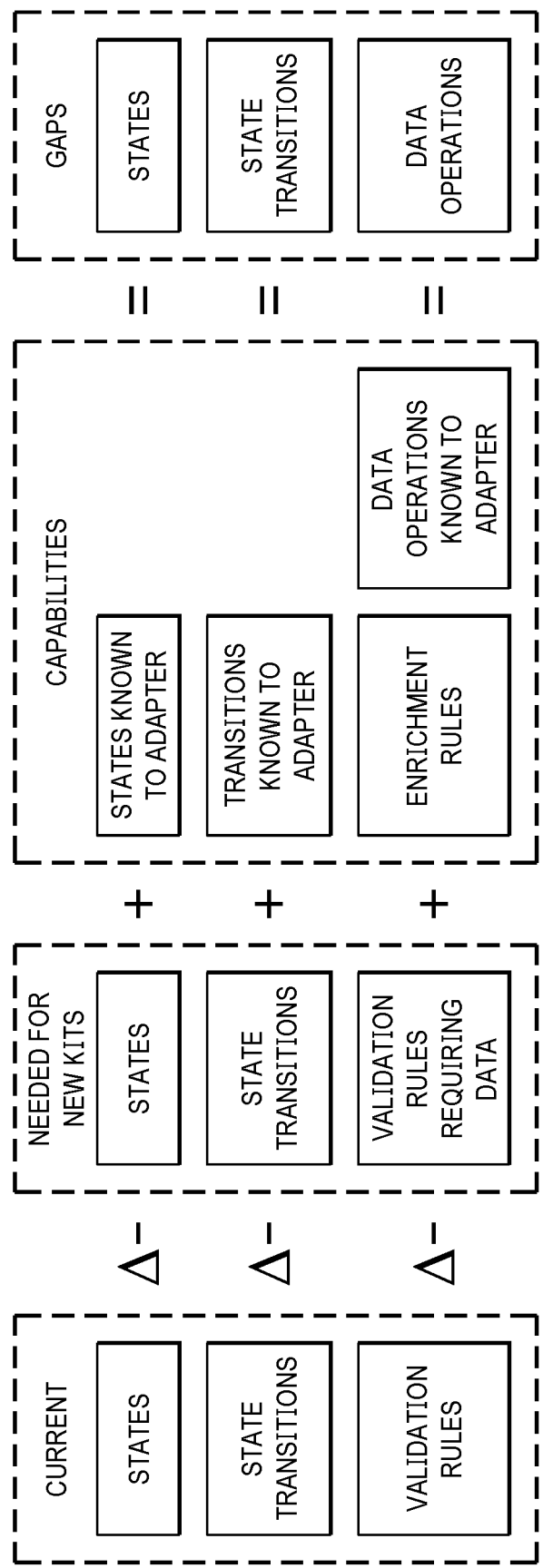
FIG. 14 shows a subset of FIG. 13 with more details in how the gap analysis and computation process works according to some embodiments disclosed herein.
Figure 15:
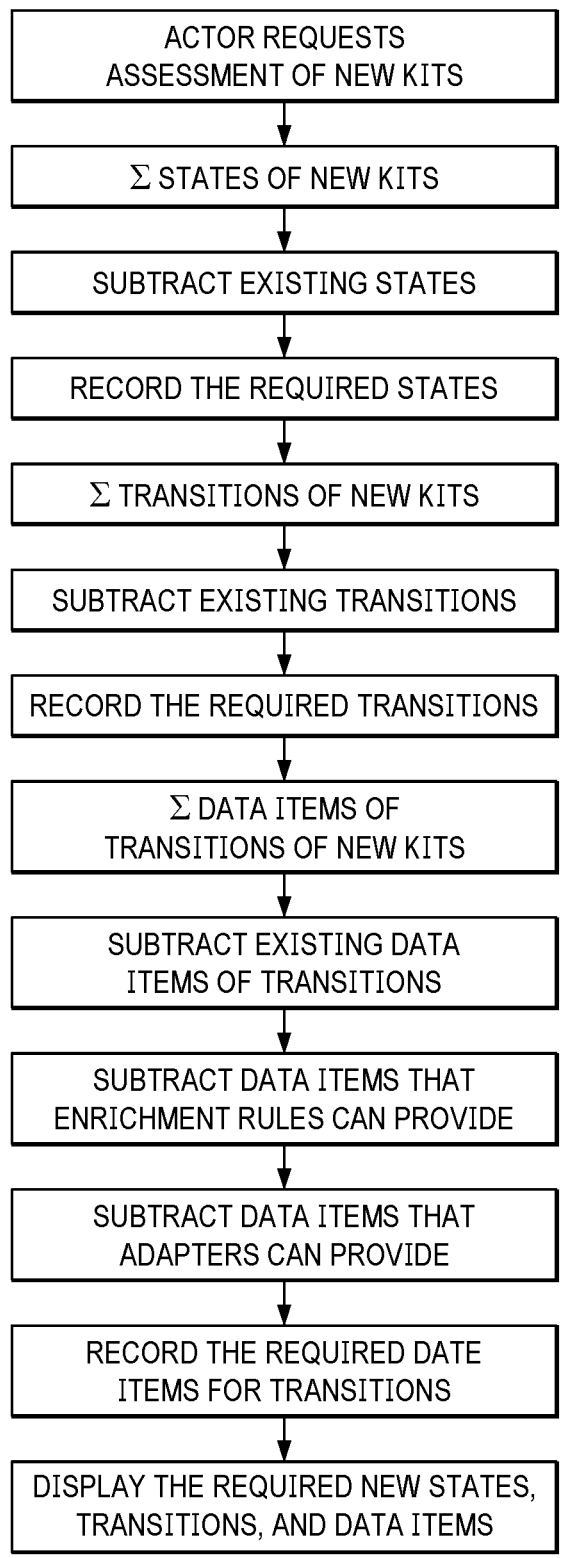
FIG. 15 is a flow diagram that shows an example of a gap analysis process according to some embodiments disclosed herein.

FIG. 14 shows a subset of FIG. 13 with more details in how the gap analysis and computation process works, according to some embodiments disclosed herein. FIG. 15 is a flow diagram that illustrates an example of running a gap analysis process at design time according to some embodiments disclosed herein. In this case, the gap analysis process returns (e.g., to a display on a user device) the required new states, transitions, and data items. Based on the outputs from the gap analysis, the system is operable to determine what handlers are needed and whether they exist internally (e.g., in a handler repository where handlers are stored). If not, the system may prompt a user to provide the handler(s) or attempt to generate the handler(s) needed.

Figure 16:
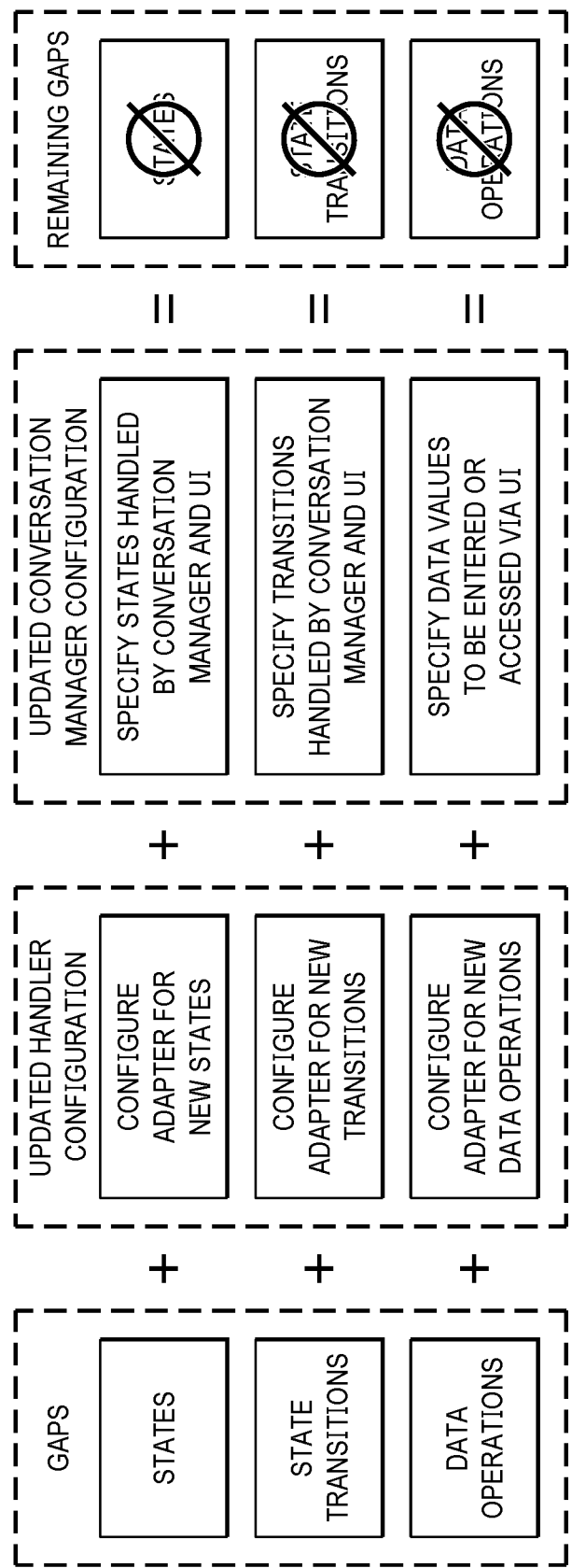
FIG. 16 shows an example of how gaps identified through a gap analysis can be remediated, according to some embodiments disclosed herein.
Figure 17:
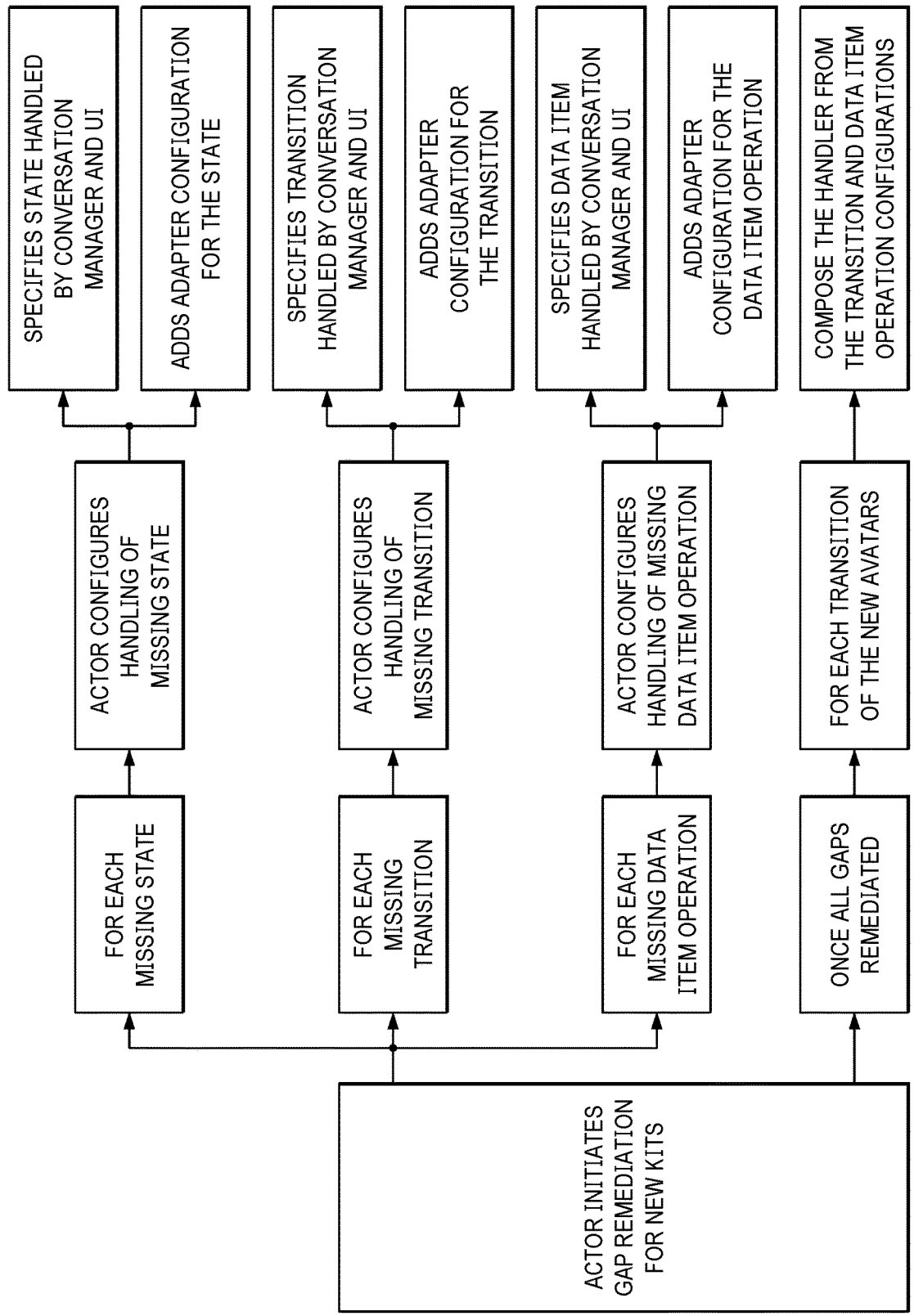
FIG. 17 shows an example of a process for remediating gaps identified through a gap analysis according to some embodiments disclosed herein.

FIG. 16 shows an example of how the gaps thus identified through the gap analysis can be remediated, according to some embodiments disclosed herein. FIG. 17 shows an example of a process for remediating the gaps according to some embodiments disclosed herein.

To illustrate the complexity and versatility of the invention, more formal notation is provided as follows.

The invention provides integration automation around a business process P. A set of electronically communicating entities E all follow P, but with individual variation. Other entities C will need to follow the business process P with one or more entities in E. P is an abstract description encompassing the range of the common patterns, conventions, standards, or other commonalities in how entities in E choose to communicate electronically. P defines the scope of behaviors that entities in C might need to implement in order to participate in the business process with entities in E.

Thus, P can be defined as: P={M, S, L, V, T, F, I}, where

M: the data model of all data groupings and items, with multiplicity, for the business process S: the set of states of the business process L: the set of standard transitions ("links" in a graph of states) allowed between states V: the set of standard validation rules on the data for transitioning over some link in L T: the set of transactions composed of data items in M that can be sent to an external party or received from an external party as part of a transition in L, and the data of some t in T might be sent as a message, through data on a stream, via API calls, etc.

F: the enrichment, or auto-fill, rules for populating data in some transaction in T for some transition in L I: the initial set of transactions in T that initiate a business process The entities e in E have varying requirements in how they follow P. For instance, one entity e in E may require that a given data item in some transaction in T must be populated with a data value, and another entity f in E does not require that the same data item have a value. e may allow a given state transition in L and another will not.

Figure 18:
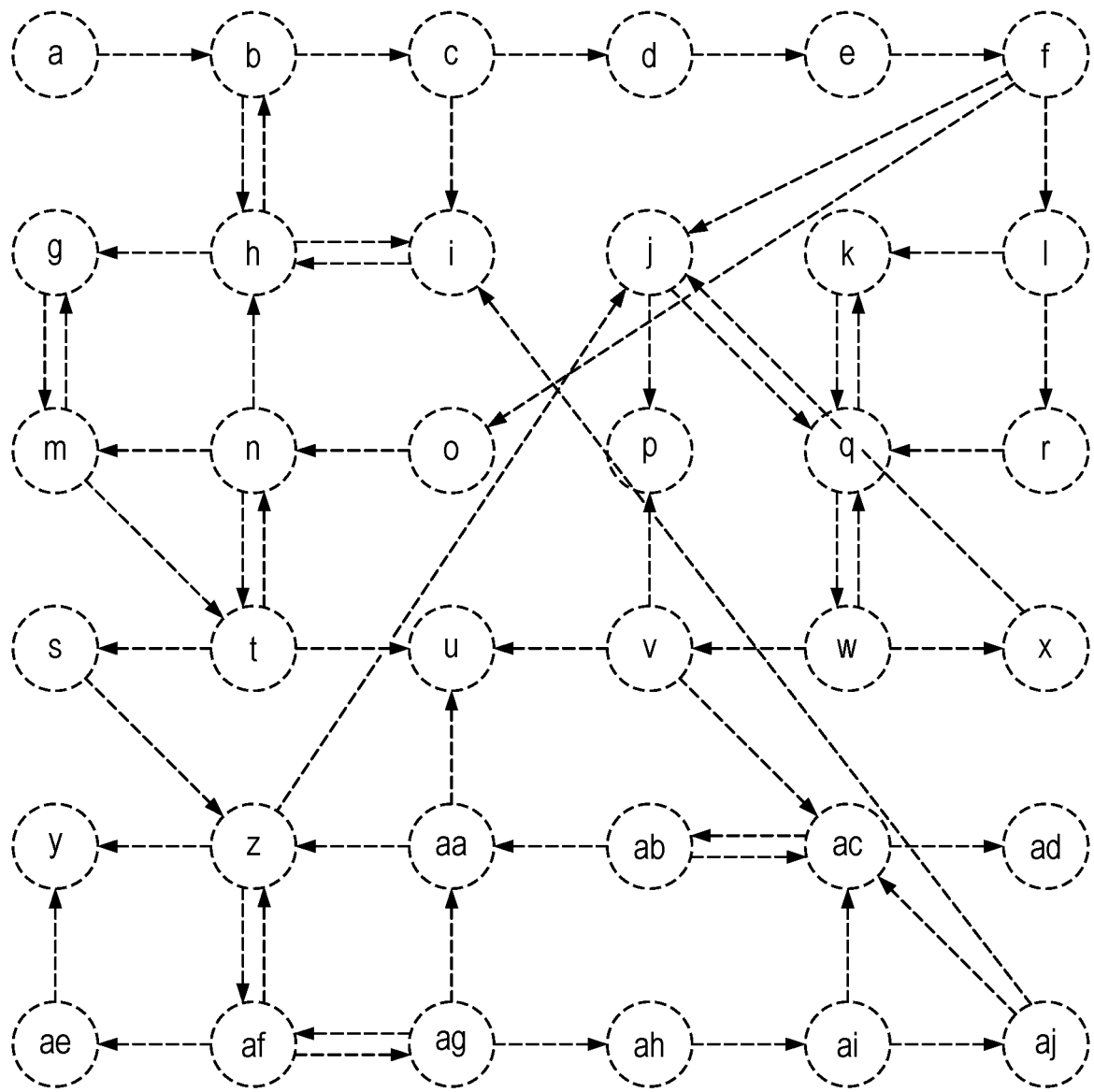
FIG. 18 shows a universe of states and transitions of avatars according to some embodiments disclosed herein.

For instance, FIG. 18 shows a universe of states and transitions in P as the possible states for communicating with all e in E over P as. That is, P describes the possibilities, and P(e) is the subset and variations that enable participating in the business process with e.

An application run by an entity has a state change (e.g., change to an order/respond to an order, etc.). The intelligent integration system listens (through its avatar using the API) to events which indicate a state change, query (through an avatar of the entity using the API) the application, and determine whether it is an important event that can cause change in integration. The determination (the avatar chooses whether to suppress the event or act on it which causes a state change) which changes FIG. 19, alter the current state.

Figure 19:
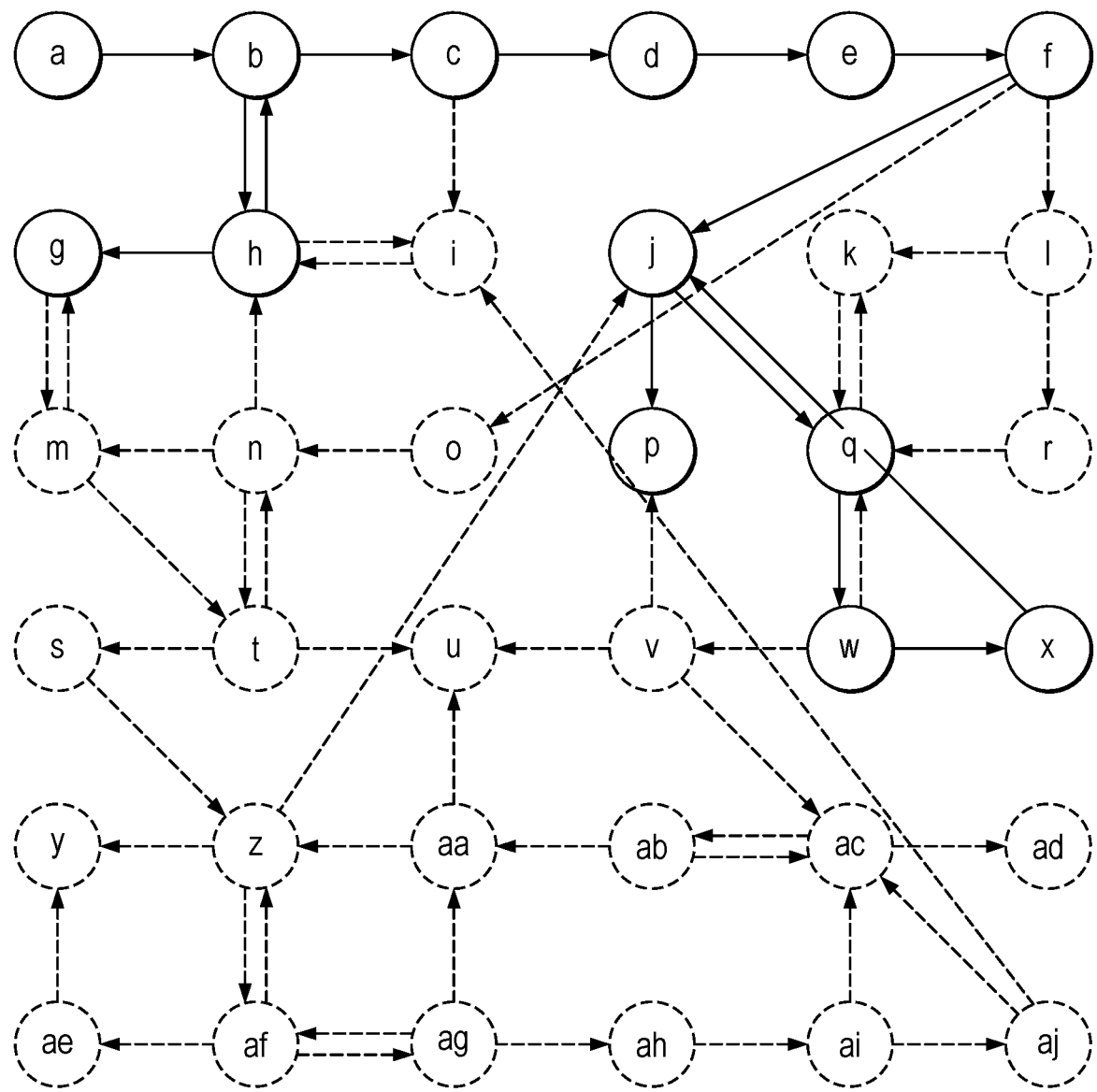
FIG. 19 illustrates by example what states and transitions might be needed by entities involved in a transaction according to some embodiments disclosed herein.

In this way, it is possible to specify the communications requirements of some entity e in E as P(e) as a valid conforming variant of P. This is shown in FIG. 19, where the solid lines indicate the states and transitions needed for e. Solid lines represent what states and transitions are actually needed by the entities involved in a transaction, so the system makes sure that the workflow has all the handlers needed for the solid lines. The system can drop the state change or proceed to find a handler that can handle the state change. If no such handler can be found, the system is operable to generate one (automatically) or have one generated (manually). The dashed lines represent a superset of possible states and transitions.

In conducting a gap analysis, the system looks at each link and determine whether it can be successfully executed. For example, P(e) will typically only allow a subset of the states in S and the state transitions in L of the transactions in T, but will typically have additional validation rules in V. However, e will typically not send and receive data that precisely conforms to the data of each t in T. Thus, data transformation rules are needed for converting between e's data and the transactions defined in T. This and other additional information can be included in Other(e). P(e) is the variations in P required by e in E, and Other(e) includes the additional information needed for some c in C to follow P(e) with e.

As a non-limiting example, suppose an employer works with a Worker's Comp insurance company that handles Worker's Comp claims and works with a medical insurance company that processes medical claims. An employee is hurt on the job and unable to work for a period of time, so the employer puts the employee on a long term leave. The medical insurance company pays medical claims. The initial state would be that the employee is injured. A state change indicates that the employee starts receiving a disability payment. The state changes when the employee's medical claim is processed. In this example, a first entity represents the employer (with a first avatar representing an HR system run by the first entity), a second entity represents the Worker's Comp insurance company, and a third entity represents the medical insurance company. The third entity wants to be notified about the employee's medical claim, but will not care about the state change for starting payment of disability. Likewise, the second entity cares about the state change for starting disability payments, but will not care about the state change for processing a medical claim.

In some cases, the second and the third entities may represent different departments of the same insurance company. The system may use a state machine for tracking the overall state and may use substrate machines for tracking different data/different state changes. In some embodiments, an avatar may communicate with multiple computing systems in one entity or across entities based on what information is needed. Modeling an overall state (in a state machine) that manages a subset of states (substrate machines), with metadata attached thereto, can be rather complex as it models behaviors and multiple possible states can exist simultaneously at any given time.

To this end, as illustrated in Table 2, the states and the transitions can be represented using data structures. For instance, a table can represent the subset of states of P required for e1 in E, where a y indicates that e1 uses a state.

TABLE 2

| State | Used by e1 |
|-------|------------|
| a     | y          |
| b     | y          |
| c     | y          |
| d     | y          |
| e     | y          |
| f     | y          |
| g     | y          |
| h     | y          |
| i     | n          |
| j     | y          |
| k     | n          |
| l     | n          |
| m     | n          |
| n     | n          |
| o     | n          |
| p     | y          |
| q     | y          |
| r     | n          |
| s     | n          |
| t     | n          |
| u     | n          |
| v     | n          |
| w     | y          |
| x     | y          |
| y     | n          |
| z     | n          |
| aa    | n          |
| ab    | n          |
| ac    | n          |
| ad    | n          |
| ae    | n          |
| af    | n          |
| ag    | n          |
| ah    | n          |
| ai    | n          |
| aj    | n          |

Table 3 below illustrates a table of transitions as used by e1 (only a subset of the possible allowed transitions are listed—not everything in P is listed):

TABLE 3

| From State | To State | Used by e1 |
|------------|----------|------------|
| a          | b        | y          |
| b          | c        | y          |
| c          | d        | y          |
| d          | e        | y          |
| e          | f        | y          |
| b          | h        | y          |
| h          | b        | y          |
| h          | g        | y          |
| c          | i        | n          |
| h          | i        | n          |
| i          | h        | n          |
| f          | j        | y          |
| j          | p        | y          |
| j          | q        | y          |
| q          | w        | y          |
| w          | q        | n          |
| w          | x        | y          |
| x          | j        | y          |

The set C is the communicating entities C that implement the "other side" of P(e). That is, if e in E sends a transaction i in I, then c in C will receive i and will follow the "other side" of the choreography by supplementing P(e) with Other(e). (Note: a single entity might be in both C and E and thus can play both roles of P).

Figure 20:
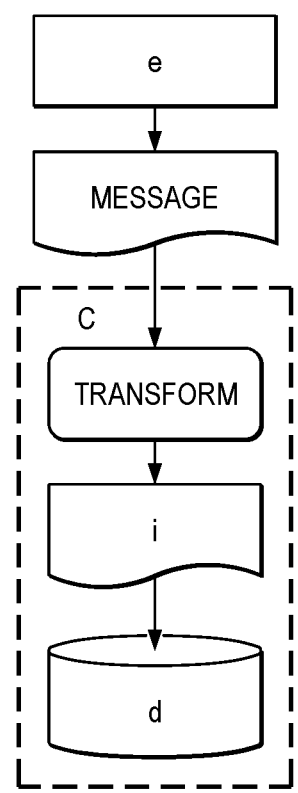
FIG. 20 illustrates an example of transforming data sent from an entity using mapping rules according to some embodiments disclosed herein.

When communicating entity e in E sends a transaction i in I to c in C, then c must instantiate the data of P(e) for i. c must create an empty data set d conforming to M. c will transform the data sent by e into i by using the mapping rules defined in Other(e) and then populate d with the data of i, which is referred to as d(i). c will also record state information, such as the current state s, the identify of sender e, into d. This is illustrated in FIG. 20.

In FIGS. 21A-21B, the canonical model M is represented in a hierarchical form or tree 2100. Here, data values include "Permitted Values" that indicate the semantic meaning of other data values. For instance, the value in Document/@wrapperType indicates that if data conforming to M is sent as a document, @wrapperType will indicate the purpose of the transmission. However, Document/Header/Identifiers/Identifier/@function indicates the kind of identifier at that point in the data model. This allows the accumulation of information of d(i) for a conversation. At that point, humans or automation in c and e can trigger the events and supply the data so that the next step in P(e) is followed (and c will use the various data in Other(e) in order to communicate with e). For instance, a human might review the information in d, and choose either to approve or reject the transaction of i. Note: "the next step in P(e)" corresponds to following a link l in L.

Previously, P(e) and Other(e) are part of a standard avatar. Additionally, the system can include validation rules v in V. For a given state transition, a validation rule can indicate information such as:

A delivery dock code must be present. Under the covers, the rule would verify that some Identifier structure in Document/Header/Identifiers/Identifier has a @function with the value "DeliveryDockCode" and the *body for that Identifier holds a value with the specified data type.

Other kinds of validation rules may also be used. As with the states and transitions, the validation rules can be represented in a table.

Figure 22:
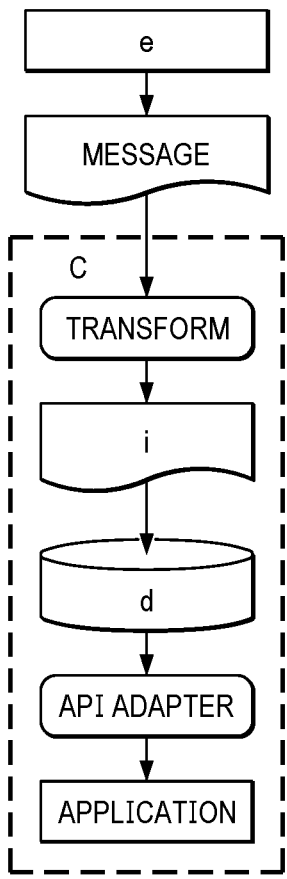
FIG. 22 illustrates a scenario in which data may need to be transformed and inserted into an application maintained by an entity according to some embodiments disclosed herein.

In some cases, c can have internal automation, such as applications, that participate in c's implementation of P(e). The data of d may need to be transformed and inserted via APIs into an Application maintained by c, as shown in FIG. 22.

This set of behaviors, data mappings, applications, etc. are referred to as the implementation(P). This implementation includes the infrastructure and processes for a c in C to implement P for a given set of entities in E. If c needs to respond to message i, then c needs to transition via some link in L and send a response message t in T to e, and t must meet the necessary validation rule in V. To assist in this, enrichment fn F will auto-populate some of the data of t. In general, f will populate as much of the data as possible. A human using a UI or app or automation such as an application must provide the remainder of the information, and can correct information provided by f.

However, if c in C desires to implement P for another communicating entity f in E, the current Implementation(P) might not meet every requirement of P(f). In particular, if automation involving applications etc. is involved in Implementation(P), communicating with an additional entity f in E requires that Implementation(P) meet all the requirements of P(f).

In looking at the automation in c, such as an Application, one might think that standardized automation for a given Application a might suffice for all c in C. For instance, many applications ship with standard APIs, have standard data and process models, and can communicate with standard file format. However, many c in C will customize their Applications. This can alter the file formats, the data of the API calls, can introduce new API calls or file types, etc. In other words, when an application is configured to meet the specialized needs of c in C, then the automation for letting the Application participate in Implementation(P) must change. Thus, the invention needs to flex to easily adapt to customizations made to Applications used by some c in C.

Accordingly, if a company c in C wants to communicate with additional companies in E, the current Implementation (P) meets the requirements of the current $P(e_1)$, $P(e_2)$, . . . , and must be adjusted to meet requirements of additional $P(e_n)$, $P(e_{n+i})$ . . . etc.

P(e) and Other(e) already exist for each additional e in E that c desires to communicate with, or else the P(e) and Other(e) will need to be built. Supporting another P(e) may cause changes in Implementation(e) such as additional:

States in S and transitions in L
Validations in V
Transactions in T and I
Data values needed in transactions in T that are already sent to other entities in E In addition, when communicating with an additional entity e, it is not desirable to alter how data is exchanged with existing partners in E—Implementation(P) should not alter its behavior for existing P(e). As discussed above, the system provides a pre-built library of P(e) and Other(e) so that an entity c in C can communicate with multiple entities in E, and can with reduced effort utilize P for additional entities in E. In this context, the invention can assist companies in C with machine-to-machine communications with one or more companies in E over process P.

Previously, when some e in E sends transaction i in I to initiate a business process, data store d will be instantiated and will be populated with the data of i and with additional information such as the sender and the initial state s in S. This is referred to as d(i). As the business process begun by I continues, as c and e send additional transactions t in T, values will be added to and updated in d(i). Thus, previously, the system is able to partially populate the data of t by using auto-fill fn F and then a human will add the remaining data. The data is mapped to e's data format for the data of T, and is delivered by some mechanism (e.g. by sending a file, through API calls, etc.).

Previously, the system can also intake incomplete data for t that is sent from an Application, import it into d(i), and then use f to populate t with data and if needed ask the user to supply the needed additional values. In this case, an Application provides the trigger for moving the state of the conversation in d(i) to another state. And if some P(e) requires data that neither the application nor d(i) holds, that data must be provided manually.

However, when c integrates (moves data through automation) with one or more Applications as part of Implementation(P), and then c wishes to converse over P with an additional e in E, the effort can be disruptive and highly manual. Making changes to an application to support an additional e is highly undesirable. In addition, refining an Application can cause manual and undesirable activity to ensure that the integrations of Implementation(P) continue to work as desired.

While the system takes control of the conversation P(e) so that c can meet e's requirements, the invention disclosed herein pushes the boundaries farther. For instance, the invention:

Extends P to have a set of configurable event handlers H that can trigger integration activities to
- populate the data of some transaction t for e elsewhere (instead of simply invoking f on d(i) to populate t with data and then asking a human to add the missing values)
- push data from t or d(i) (instead of generating a file for something else to pick up)

Events can come from anywhere, not just from a human through the UI, from e, or from an Application Handlers can interact with multiple APIs, files, databases, etc. to extract or inject necessary data Adapts to customizations made to an Application through configuration files that guide the behavior of the event handlers of H, thus also buffering the integration from changes made to an Application Applies automation to adapt to new requirements for P(e) for an additional e in E and provides a gap analysis for any missing items of data that handlers in H cannot already provide From another perspective, the invention provides the equivalent of intelligent agents for interacting with the Applications etc. in c in order to address the needs of $P(e_1)$, $P(e_2)$, ..., $P(e_n)$ and any new $P(e_{n+1})$ that c wishes to support.

In some embodiments, for Implementation(P) meeting the needs of $P(e_1)$, $P(e_2)$, ..., $P(e_m)$, in order to also meet the requirements of $P(e_{m+1})$, ..., $P(e_n)$, the system is operable to make sure that an updated Implementation(P) is capable of meeting the extended requirements. In a choreography with some entity e in E, the only a subset of Implementation (P) is likely to be needed, but there should be no requirement for some f in E that and updated Implementation(P) cannot address should f require it. Note, since Other(e) already exists, data mappings and other requirements to communicate with e are already addressed.

In some embodiments, the system is operable to address:
- The additional states in S and transitions in L are the states and transitions $P(e_{m+1}) \cup ... \cup P(e_n)$ that are not already in Implementation(P)
- Each message t in T not already in Implementation(P)
- Each validation rule r in some v in V required by $P(e_{m+1})$, ..., $P(e_n)$ that is not already in Implementation(P) may indicate additional requirements to be able to populate data values in messages in T In some embodiments, P is updated to include H:
P={M, S, L, V, T, F, I, H}, where H is the set of (event, handler) tuples such that when the event is triggered, the handler is invoked.

Figure 23:
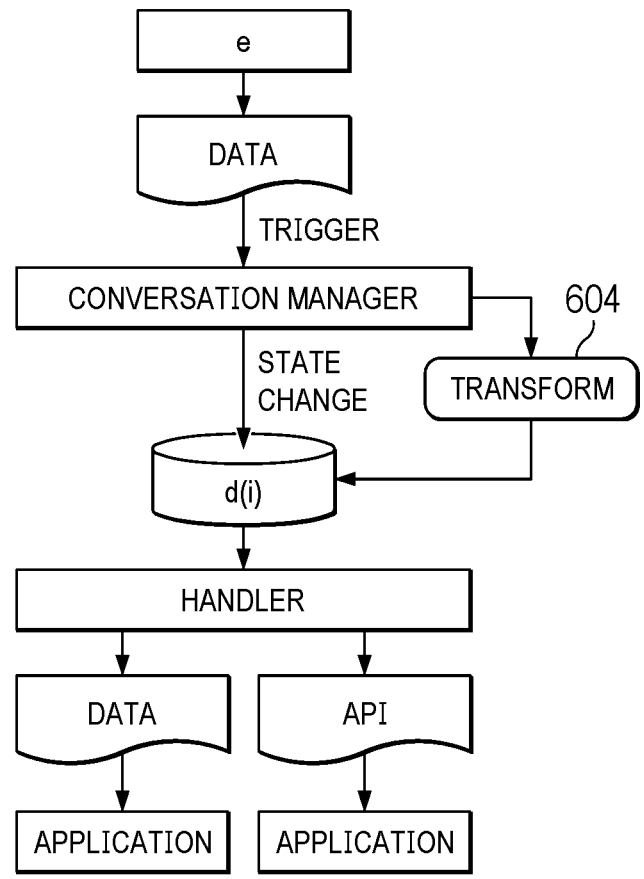
FIG. 23 shows an example of a process involving a trigger and a handler according to some embodiments disclosed herein.

For data arriving by file, API, or some other means to a c in C from an e in E, for a process that was previously initiated by a message i from e, FIG. 23 shows the process involving a trigger and a handler.

In the example of FIG. 23, the arrival of the data is an event, the arriving data is transformed from e's format and inserted into d(i) and the state is changed in d(i), and the handler then utilizes the data in d(i) to generate a file and then transfers it, and to make API calls so that information is made available to Applications.

However, since d(i) holds the necessary state of P(e), it is also entirely possible that the arrival of the data and the event raised by that arrival does not trigger an event handler. This is illustrated in FIG. 24.

Figure 24:
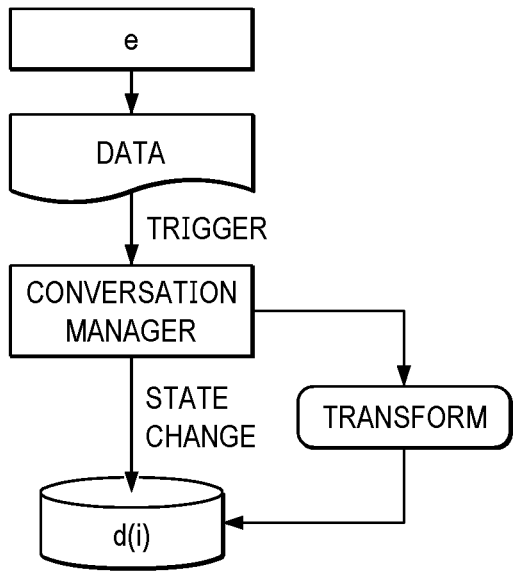
FIG. 24 shows an example in which the arrival of data and an event raised by that arrival does not trigger an event handler according to some embodiments disclosed herein.

In the example of FIG. 24, none of the applications might be able to handle some of the states of P(e). This might occur if, for instance:

- For a supply chain or logistics business process, none of the applications are able to handle the kind of shipment (e.g. a drop ship)
- For healthcare data, none of the applications might be able to handle certain kinds of medical reports, but d(i) will contain the repository of that data so it is available should a healthcare professional need access to it
- For error conditions relating to conveying data to/from e or an Application, d(i) can hold that error state information until the error is resolved When an event is raised, handlers may pull data from Applications to update the information in d(i) so it has the necessary data for some t in T to be sent to e. The implementation for generating a transaction t to be sent to e will:
1. Identify the subset of t that e requires or will optionally accept. This subset is referred to as t'.
2. Use handlers to collect the available data values of t' as described above and record the data values into d(i). This step can add additional values or overwrite values in d(i).
3. Invoke the enrichment auto-fill rule F to populate as much of t' as possible.

Once completed, can be validated etc. and appropriate measures taken.

Figure 25:
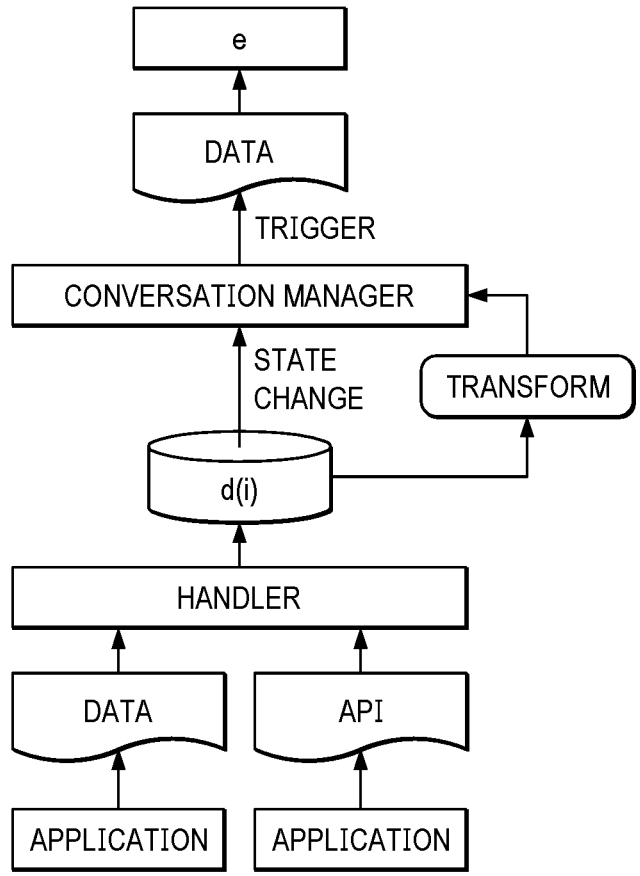
FIG. 25 depicts a flow of information for sending data to an entity according to some embodiments disclosed herein.

FIG. 25 depicts a flow of information for sending to e. FIG. 25 illustrates that anything can raise the event—a user working at a keyboard, e asking for a status update, an Application indicating that the next step is ready, etc. FIG. 25 also illustrates a complex situation, e.g., given an event, the handler might pull data from one Application and insert data into a second Application.

A handler h in H can have custom behaviors, but can also make use of configurable behaviors. This configurability enables the handler to adapt to customizations made by c to one or more Applications. For an API. For a data item in M (and thus in d(i)), the handler has access to records indicating:
- The data item
- The API call for fetching or putting the data item
- Query information for the API call (e.g. for healthcare data, the patient id and doctor visit id)
- The location of the needed data value in the response to the API call For files generated by Applications, the handler can make use of:
- The data item
- The file or report generated by the Application or consumed by an application
- Query information into the file (e.g. for a sellable item, the location of the item id)
- The location of the needed data value For acquiring data, the information can be queried and d(i) updated, and often multiple values needed in d(i) can be fetched via a single API call or from a single file. For pushing data from the invention, entire payloads of API calls or entire files may need to be generated. In both cases, the invention relies on data maps, as discussed above, but also allows configurable "overrides" that update the behavior of the map for the variations in the data.

In some embodiments, the system may perform an impact/gap analysis at design time, for instance, when a c requests that an implementation (P) be analyzed to identify the gaps that need to be addressed to meet the needs of entities $e_{m+1}$, ..., $e_n$. The impact/gap analysis:
- Identifies the new states and transitions that are in $P(e_{m+1}) \cup ... \cup P(e_n)$, but not in the current Implementation(P). New transitions that are not already in Implementation(P) will need to be handled.

Identifies the data of each transaction t of T that is required by $P(e_{m+1}) \cup \ldots \cup P(e_n)$ where that data item is not required by t in the current Implementation(P). This may mean that entire transactions in I and T will now be exchanged with an entity e in E. Note since t in T is an extract of d which conforms to model M, then identifying a data item in t is also identifying a data item in d. Data items of some t not currently in Implementation(P) can be handled in several ways.

Figure 26:
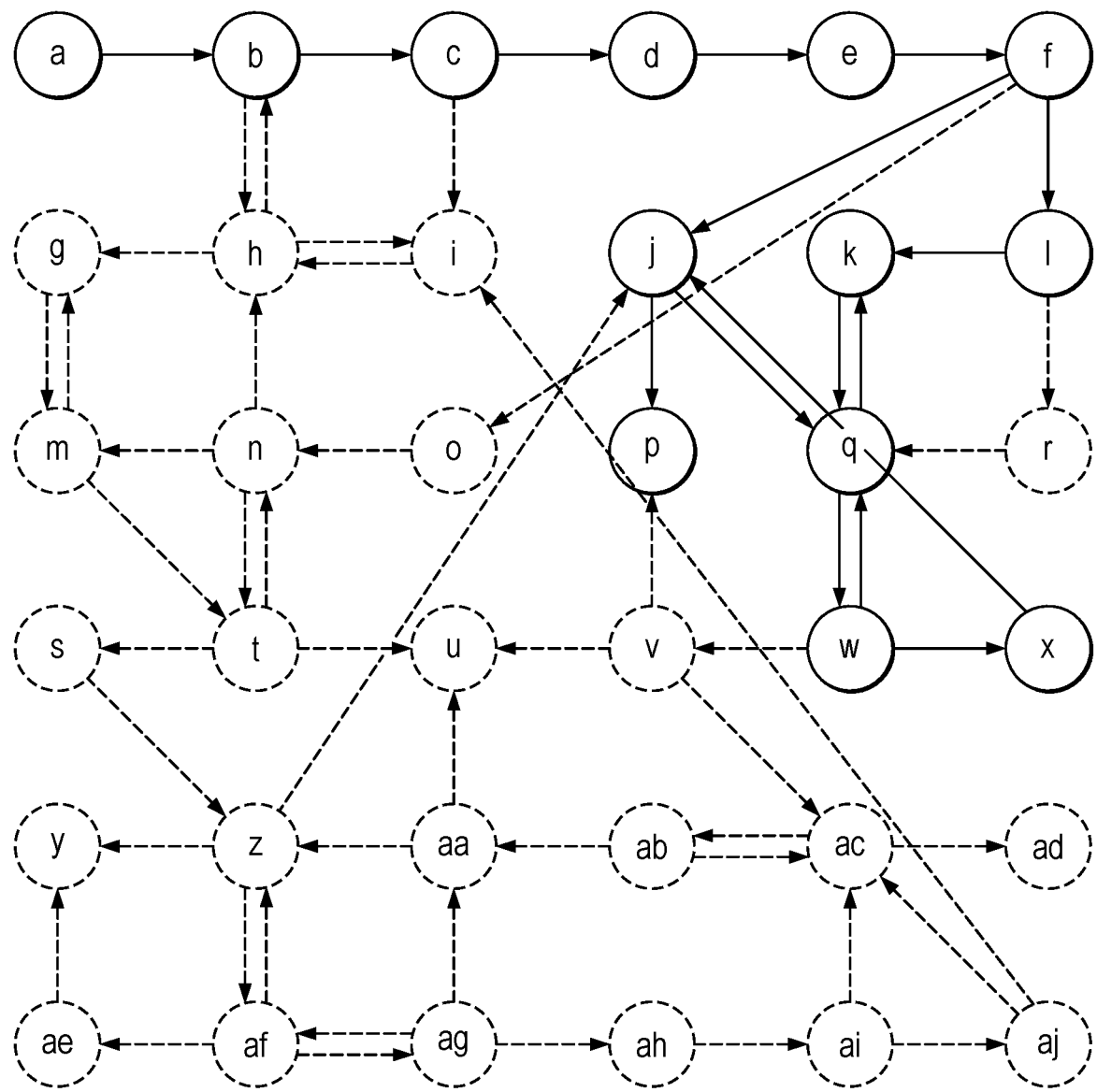
FIG. 26 shows states and transitions when working with another entity according to some embodiments disclosed herein.

For instance, FIG. 26 shows the states and transitions when working with an e2 in E. Table 4 below shows the states used by e1 (as mentioned above) and e2.

TABLE 4

| State | Used by e1 | Used by e2 |
|---|---|---|
| a | y | y |
| b | y | y |
| c | y | y |
| d | y | y |
| e | y | y |
| f | y | y |
| g | y | n |
| h | y | n |
| i | n | n |
| j | y | y |
| k | n | y |
| l | n | y |
| m | n | n |
| n | n | n |
| o | n | n |
| p | y | y |
| b | y | y |
| r | n | n |
| s | n | n |
| t | n | n |
| u | n | n |
| v | n | n |
| w | y | y |
| x | y | y |
| y | n | n |
| z | n | n |
| aa | n | n |
| ab | n | n |
| ac | n | n |
| ad | n | n |

TABLE 4-continued

| State | Used by e1 | Used by e2 |
|---|---|---|
| ae | n | n |
| af | n | n |
| ag | n | n |
| ah | n | n |
| ai | n | n |
| aj | n | n |

Table 5 below shows how the states used by e1 and e2 as (showing only a part of the overall table of transitions in P) can be represented in a table.

TABLE 5

| From State | To State | Used by e1 | Used by e2 |
|---|---|---|---|
| a | b | y | y |
| b | c | y | y |
| c | d | y | y |
| d | e | y | y |
| e | f | y | y |
| b | h | y | y |
| h | b | y | n |
| h | g | y | n |
| c | i | n | n |
| h | i | n | n |
| i | h | n | n |
| f | j | y | y |
| f | l | n | y |
| j | p | y | y |
| j | q | y | y |
| q | w | y | y |
| w | q | n | y |
| w | x | y | y |
| x | j | y | y |
| l | k | n | y |
| k | q | n | y |
| q | k | n | y |

Figure 27:
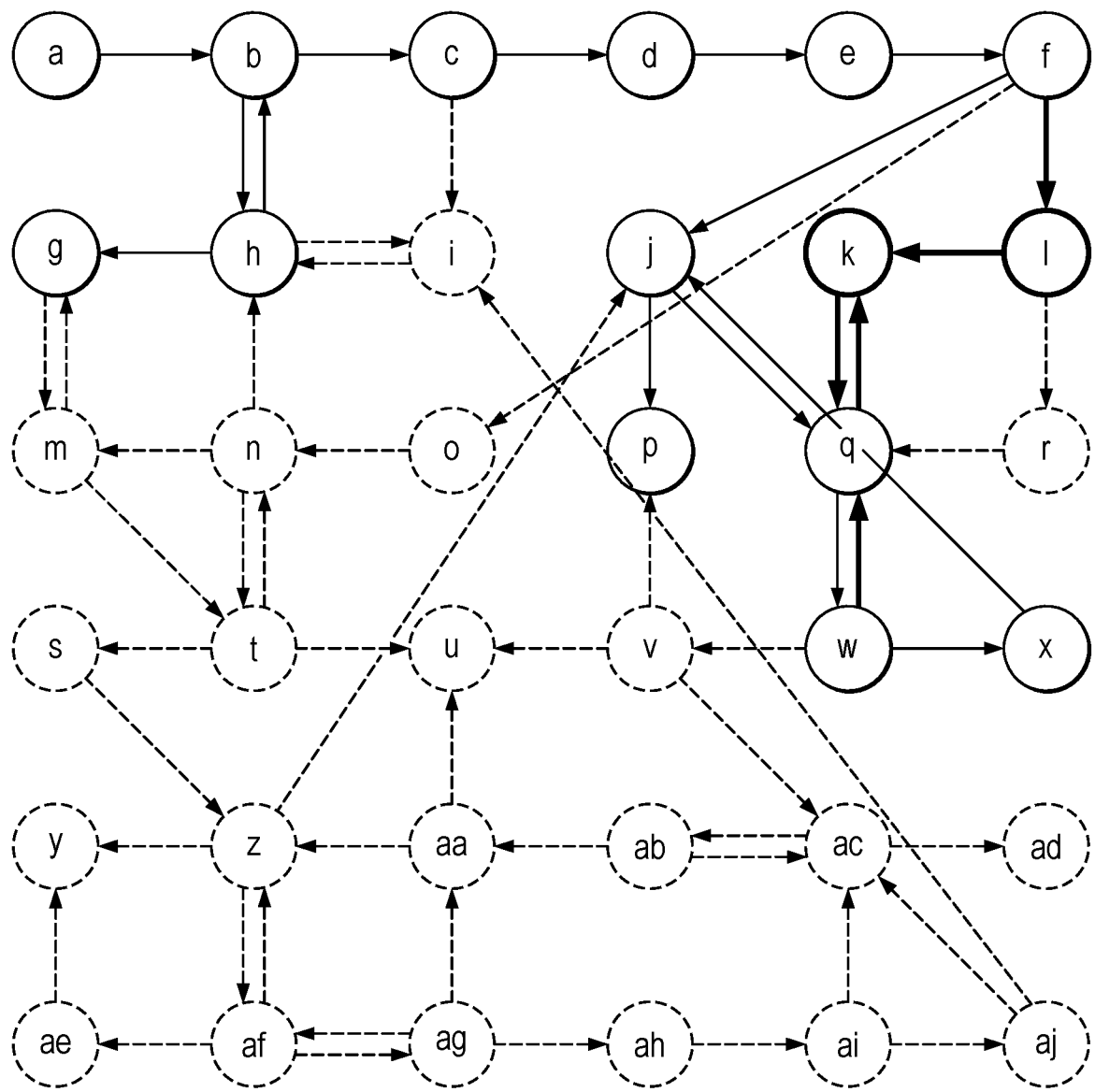
FIG. 27 shows a merged set of states and transitions needed for the entity of FIG. 25 and the entity of FIG. 26, indicating the additional states and transitions that need to be added to an implementation to add support for the entity of FIG. 26, according to some embodiments disclosed herein.

FIG. 27 shows the merged set of states and transitions needed for e1 and e2, indicating the additional states and transitions that need to be added to Implementation (P) to add support for e2.

Similarly, if e1 and e2 both share a transition, the validation rules for that transition can be compared and a list of gaps can be provided. For instance, the validation rules can be represented as illustrated in Table 6 below.

TABLE 6

| From State | To State | Data Field | Rule for e1 | Rule for e2 |
|---|---|---|---|---|
| e | f | /Document/Header/Identifiers/Identifier[@function="AccountCode"]/*body | N/A | number |
| e | f | /Document/Header/Identifiers/Identifier[@function="CarrierTrackingNumber"]/*body | string with length >5 | N/A |
| e | f | /Document/Header/DatesAndTimes/DateTime[@function="BackOrderDate"]/*body | dateTime | dateTime |

In this portion of the validation rules for e1 and e2, it can be seen that the data field /Document/Header/Identifiers/Identifier[@function="AccountCode"]/*body must hold a numeric value in order to Implementation(P) that supports e1 to also support e2.

To identify how a handler may satisfy the need for the value for data items, such as the field /Document/Header/Identifiers/Identifier[@function="AccountCode"]/*body, the invention leverages information about different applications. An example is shown in Table 7 below.

TABLE 7

| State | Field | Application | API Call | API Item |
|---|---|---|---|---|
| e | /Document/Header/Identifiers/Identifier[@function="AccountCode"]/*body | Application 5 | getPoData | /po/client/identifier |
| e | /Document/Header/Identifiers/Identifier[@function="AccountCode"]/*body | Application 6 | accountInfo | /account/code |
| e | /Document/Header/Identifiers/Identifier[@function="DUNS"]/*body | Application 5 | getClientData | /client/DUNS |
| e | /Document/Header/Identifiers/Identifier[@function="DUNS"]/*body | Application 6 | accountInfo | /account/DUNS |

In this case, "Application 5" and "application 6" are placeholders into either the standard configuration of different applications such as SAP, Netsuite etc., or may signify how to access data in an application that has been customized. In some embodiments, the system can automatically identify that if the company c in C uses Application 6, and needs the value /Document/Header/Identifiers/Identifier[≠function="AccountCode"]/*body, the handler can use the accountInfo API call and retrieve the data value of /account/code. In some embodiments, different API calls can have query conditions that are not specifically mentioned here. Similarly, a handler can indicate in a file format the location of data values. In some embodiments, a new handler can be generated by reconfiguring and/or modifying an existing handler so as to adapt and be able to provide the necessary information.

In some embodiments, once Implementation(P) has been compared with the requirements for integrating with e2, the automatic adaptations and the remaining gaps can be summarized in a report for human review.

In some embodiments, to address any gaps flagged by the system:
1. States and Transitions: Implementation(P) will automatically track the new state because the P(e) for the new e in E will have that state. By registering the P(e) with Implementation(P), the new states will also registered. This then raises the following considerations for each new state:
   a. Does any Application in C's environment care about the state, or is some Application or other entity in c responsible for triggering the event for transitioning from the state? If so, then handlers may need to be updated. If not, no action is needed.
2. Additional data items in some tin T that are sent out: If additional data is needed for some tin T because the data item will not be in d(i), or a new transaction in T is required and not all the needed data will be in d(i), and if the handler configurations cannot handle those data items, then the options are:
   a. Add additional handler configuration data to acquire the data items on demand
   b. Allow a human to supply those data values
3. Additional data items in some tin T that is received from an e in E: if an Application requires that data item for its processing, or if it is desired that some report or other entity in c should receive that data, and if the handler configurations cannot push that data, then the options are:
   a. Add additional handler configuration data to push the data items
   b. Enable entities in c to query d(i) to fetch the data values on demand
4. Specification and Testing: the invention can generate specification information for handlers and engage in test choreographies, simulating the behavior of an e in E to ensure that the handlers are behaving correctly prior to testing with e.

Although not discussed here, entities in c can query d(i) through API or by generating data files on demand.

Thus, the invention disclosed herein can:
- streamline the process of c identifying the impact of participating in P with e (thus allowing c to consider the effort and time needed before it could participate in P with e);
- automatically and silently handle new requirements in P(e) for a new e in E; and
- enable humans to minimize any manual work or integration changes for handling P(e) for a new e in E.

As alluded to above, typical implementations of P are application-centric: it is assumed that the application will generate the data values, or that an application can be queried to retrieve the values, and if they can't, then often-difficult human effort will supply the missing data. Contrastingly, the invention disclosed herein is business-process-centric: the applications, application networks, etc. will be queried only to supply missing data values or to override default data values, and the data values are added to business process data store d(i) and then processed. In this way, human input such as through a UI is minimized, as that is not sustainable as transaction volume increases.

Further, as discussed, integration requirements might change by c starting to work with an additional e in E, by an e in E altering its requirements, by an Application configuration change, and so on. This invention creates an automated ability for ensuring that d(i) will continue to be automatically populated with data even when integration requirements change.

Figure 28A:
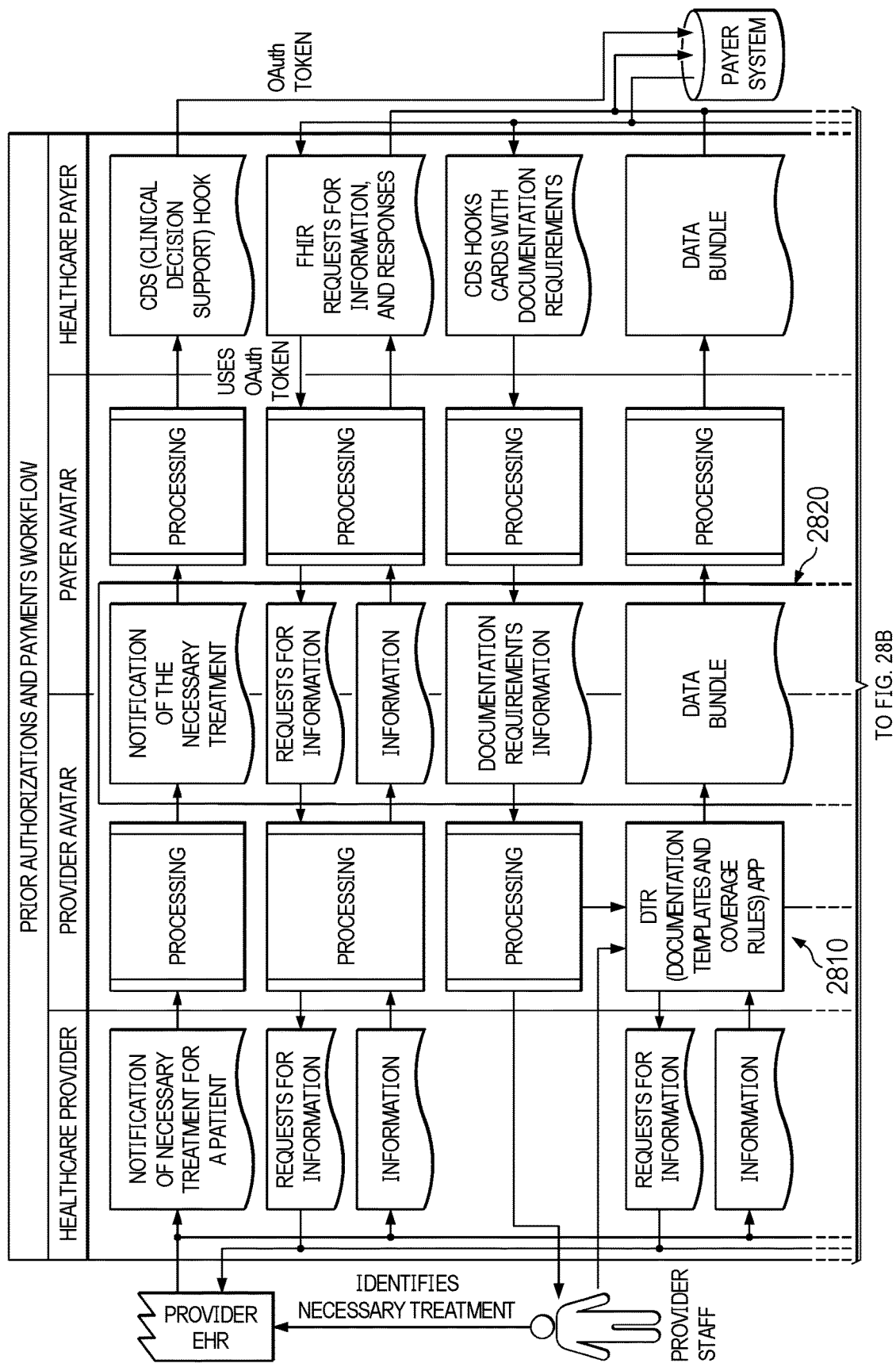
FIGS. 28A-28B show an example of a workflow that involves multiple avatars, multiple entities, and multiple applications, according to some embodiments disclosed herein.
Figure 28B:
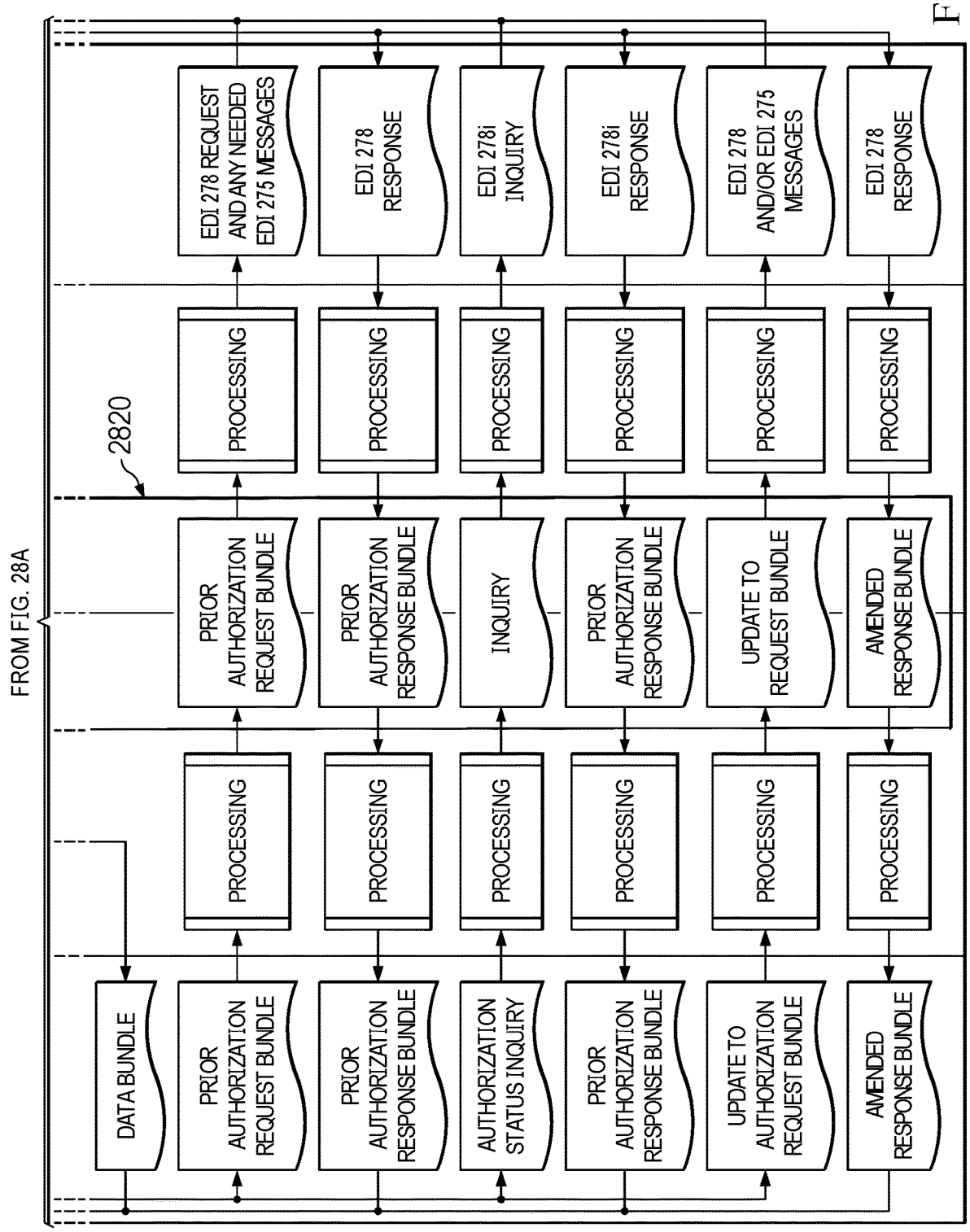

FIGS. 28A-28B show an example of a modeled process in the U.S. insurance space, according to some embodiments disclosed herein. In this example, a prior authorizations and payments workflow involves a payer avatar operating in a first workflow implementation and a provider avatar operating in a second workflow implementation. The payer avatar represents a first computing system that operates in a first computing environment of a first entity, Healthcare Payer. The provider avatar represents a second computing system that operates in a second computing environment of a second entity, Healthcare Provider.

The prior authorizations and payments workflow shown in FIGS. 28A-28B is a complicated one, involving multiple entities (e.g., Healthcare Provider and Healthcare Payer) and applications (e.g., an electronic health records or HER system, a payer system, and a documentation templates and coverage rules or DTR system 2810). In addition to the payer avatar, the first workflow implementation comprises a set of handlers and a choreography describing how business entities (e.g., Healthcare Provider) and their workflows are to follow rules defined in a choreography key 2820 in order to exchange information with the healthcare payer. In this example, Healthcare Payer is a rule setter and Healthcare Provider is a rule follower. The prior authorizations and payments workflow has a left side and a right side with a recognizable "contact in the middle" each time control passes from one side to the other.

Figure 29:
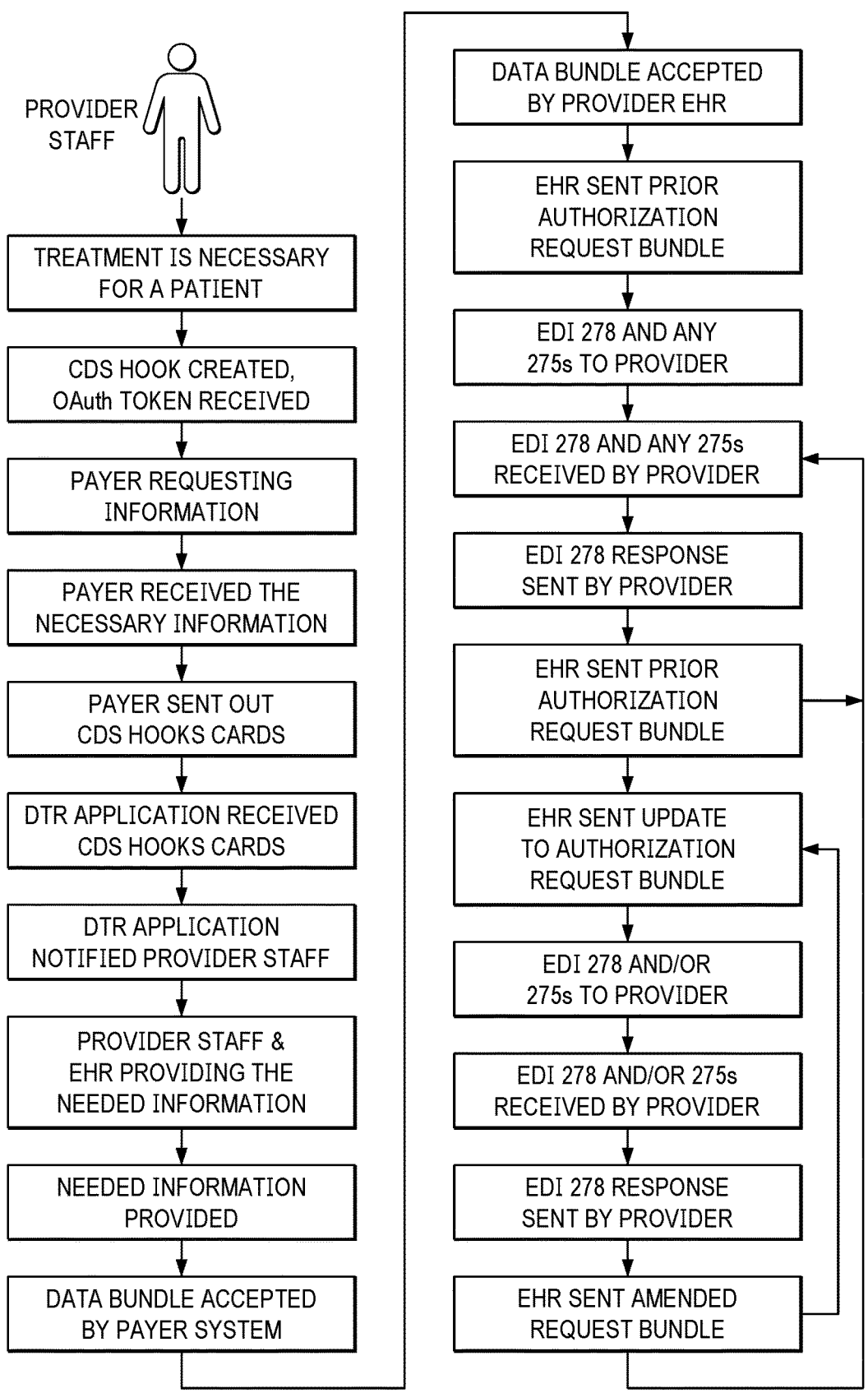
FIG. 29 illustrates an entity's perspective of the workflow shown in FIGS. 28A-28B, according to some embodiments disclosed herein.

FIG. 29 illustrates a perspective of the workflow shown in FIGS. 28A-28B. Specifically, from the viewpoint of Healthcare Provider, a provider staff may indicate to the second computing system that a treatment is necessary for a patient. This means that the second computing system needs to send a notification to the first computing system to notify a clinical decision support (CDS) module of Healthcare Payer that the patient needs a necessary treatment. Thus, a CDS hook is created and an authentication token (e.g., OAuth token) is obtained from the first computing system. In response to the notification, Healthcare Payer may request for information (e.g., about the patient, the treatment, etc.) and Healthcare Provider, in turn, provides the information requested by Healthcare Payer. As illustrated in FIGS. 28A-28B, in the prior authorizations and payments workflow, this kind of back-and-forth processing takes place to and from the first and second entities through their respective avatars.

However, as discussed above with reference to FIGS. 2A-3, in practice, it is rare that two choreographies can align perfectly. This is because each computing system involved in the workflow may have their own requirements of data. Each change of control between the left side and the right side of the workflow may involve meshing these requirements, some of which relate to EDI, some can be based on APIs, and so on. Therefore, something almost always would need to happen in the middle between the two choreographies. Accordingly, an intelligent integration system disclosed herein can act as that "something in the middle" and model a workflow composed of activities to convert data (which could be of various types) of a transaction, according to rules defined in the choreography key 2820. In some embodiments, the intelligent integration system is operable to perform a gap analysis at design time and determine that the left side does not meet a processing requirement (i.e., a gap that cannot be handled by an existing set of handlers in the second workflow implementation). In some embodiments, an authorized user (e.g., the provider staff) may determine a handler (e.g., DTR app 2810) that can meet the processing requirement and set up the handler to fill the gap (e.g., receiving an input from a previous processing element and providing an output such as a required data bundle to a subsequent processing element).

As a non-limiting example, requirements on data "in the middle" can include: structure of the data (e.g., what is mandatory, data types, etc.), workflow requirements (e.g., later transactions in the workflow must include identifier values from earlier transactions, etc.), co-variance (e.g., if A is present, then B must have a value (AND), if C is not present, then D must have a value (OR), etc.), agreed-upon-data (e.g., a dermatologist wanting to do an open-heart surgery would fall outside the agreement between these communicating entities, etc.), and so on. Other data requirements may also be possible.

Figure 30:
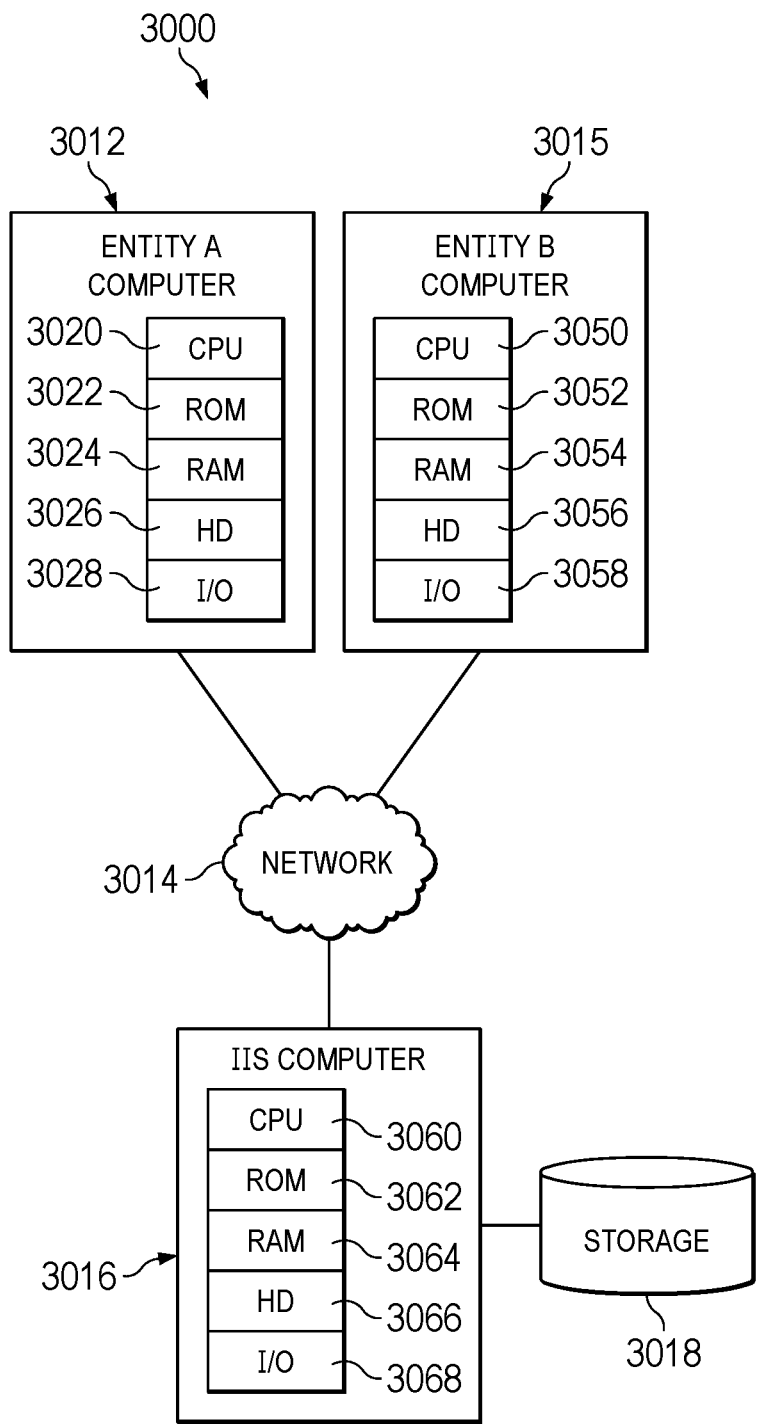
FIG. 30 illustrates an exemplary architecture for network computing environment for implementing an embodiment disclosed herein.

FIG. 30 illustrates an exemplary architecture for network computing environment 3000 that includes network 3014 and computers 3012, 3015, and 3016. Computers 3012, 3015, and 3016 can be bi-directionally coupled to network 3014. Computers 3012, 3015, and 3016 may operate in different computing environments. Computers 3012, 3015, and 3016 may represent computing systems operating in different entities (e.g., an entity A, an entity B, an intelligent integration system or IIS). The 115 can be bi-directionally coupled to a database 3018 for storing kits, data models, rules, handlers, and so on. Network 3014 may represent a combination of wired and wireless networks that network computing environment 3000 may utilize for various types of network communications known to those skilled in the art.

For the purpose of illustration, a single system is shown for each of computers 3012, 3015, and 3016. However, within each computer, a plurality of computers (not shown) may be interconnected to each other over network 3014. For example, a plurality of entity A computers and a plurality of entity B computers 3015 may be coupled to network 3014. Each computer may include a data processing system for communicating with an electronic information exchange platform. In some embodiments, computer 3016 may operate in the computing environment that supports the electronic information exchange platform.

Computer 3012 can include central processing unit ("CPU") 3020, read-only memory ("ROM") 3022, random access memory ("RAM") 3024, hard drive ("HD") or storage memory 3026, and input/output device(s) ("I/O") 3028. I/O 3029 can include a keyboard, monitor, printer, electronic pointing device (e.g., mouse, trackball, stylus, etc.), or the like. Computer 3012 can include a desktop computer, a laptop computer, a personal digital assistant, a cellular phone, or nearly any device capable of communicating over a network. Computer 3015 may be similar to computer 3012 and can comprise CPU 3050, ROM 3052, RAM 3054, HD 3056, and I/O 3058.

Likewise, computer 3016 may include CPU 3060, ROM 3062, RAM 3064, HD 3066, and I/O 3068. Computer 3016 may include one or more backend systems configured for providing a variety of services to computers 3012 and 3015 over network 3014. Many other alternative configurations are possible and known to skilled artisans.

Each of the computers shown in FIG. 30 may have more than one CPU, ROM, RAM, HD, I/O, or other hardware components. For the sake of brevity, each computer is illustrated as having one of each of the hardware components, even if more than one is used. Each of computers 3012, 3015, and 3016 is an example of a data processing system. ROM 3022, 3052, and 3062; RAM 3024, 3054, and 3064; HD 3026, 3056, and 3066; and database 3018 can include media that can be read by CPU 3020, 3050, or 3060. Therefore, these types of memories include non-transitory computer-readable storage media. These memories may be internal or external to computers 3012, 3015, or 3016.

Portions of the methods described herein may be implemented in suitable software code that may reside within ROM 3022, 3052, or 3062; RAM 3024, 3054, or 3064; or HD 3026, 3056, or 3066. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A method for intelligent integration, the method comprising:
running, by an intelligent integration system executing on a processor, a workflow implementation in a test mode, the running comprising:
operating a first avatar to represent a first computing system in a first computing environment of a first entity, wherein the workflow implementation comprises the first avatar, a set of handlers, and a choreography;
operating a second avatar to represent a second computing system in a second computing environment of a second entity, the intelligent integration system operating in a third computing environment that is different from the first computing environment and the second computing environment;
receiving a message from the second entity to the first entity, the message containing data, wherein arrival of the data from the second entity triggers the first entity to invoke an integration activity, wherein the integration activity follows the choreography, wherein the choreography has a choreography key, and wherein moving the data through the choreography is defined and governed by the choreography key;
stopping, by the intelligent integration system, moving the data through the choreography;
at design time, by the intelligent integration system:
determining a handler that can meet a requirement of the choreography key that is not met by the set of handlers; and
updating the workflow implementation to include the handler; and
continuing or restarting the workflow implementation in the test mode with the handler that can meet the requirement of the choreography key.

2. The method according to claim 1, further comprising:
mapping requirements for a first application running on the first computing system in the first computing environment to requirements for a second application running on the second computing system in the second computing environment; and
determining, in view of the mapping and the data, the requirement of the choreography key that is not met by the set of handlers.

3. The method according to claim 2, wherein the first application controls states of the choreography, wherein the choreography defines a scope of behaviors that need to be implemented in order to communicate with the first entity electronically.

4. The method according to claim 3, wherein the second entity is required to meet the requirements of the first application so as to follow the choreography.

5. The method according to claim 2, wherein the requirements of the first application comprise disparate data and processing requirements and wherein the disparate data and processing requirements are subject to change from time to time unbeknownst to the second entity.

6. The method according to claim 5, wherein the first application comprises an enterprise resource planning system.

7. The method according to claim 1, wherein the integration activity comprises utilizing the set of handlers for:
creating a data set conforming to a data model, the data set initially empty;
transforming the data from the second entity from a format of the second entity to a format of the first entity;
inserting the data thus transformed into the data set conforming to the data model; and
changing a corresponding state in the data set.

8. The method according to claim 7, wherein the data set is utilized by one of the set of handlers to generate and transfer a file.

9. The method according to claim 1, wherein the avatar of the first entity is operable to transform the data using mapping rules.

10. The method according to claim 1, wherein the set of handlers is capable of interacting with multiple application programming interfaces (APIs), files, and databases to extract or inject necessary data for a plurality of integration activities.

11. The method according to claim 1, wherein behaviors of the set of handlers are guided by configuration files.

12. The method according to claim 1, further comprising: running a second workflow implementation in the test mode, wherein the second workflow implementation comprises a second avatar, a second set of handlers, and another choreography.

13. The method according to claim 1, wherein the workflow implementation comprises:
a data model of data groups and data items for the workflow implementation;
states of the workflow implementation;
a set of transitions allowed between the states;
a set of validation rules applicable to the set of transitions;
a set of transactions composed of the data items;
enrichment rules for populating data in a transaction for a transition; and
an initial set of transactions in the set of transactions.

14. The method according to claim 1, further comprising: applying automation for adapting to new requirements of a fourth entity that facilitates moving the data through the choreography.

15. The method according to claim 1, wherein the second entity is one of a plurality of entities that communicate with the first entity electronically.

16. The method according to claim 1, wherein the first entity represents a buyer and wherein the second entity represents a seller.

17. The method according to claim 1, wherein the first entity and the second entity are trading partners that communicate electronically through an information exchange platform.

18. The method according to claim 1, wherein the intelligent integration system operates on an information exchange platform and wherein the first computing system and the second computing system are communicatively connected to the intelligent integration system through the information exchange platform.

19. A system for intelligent integration, the system comprising:
a processor;
a non-transitory computer-readable medium; and
instructions stored on the non-transitory computer-readable medium and translatable by the processor for:
running a workflow implementation in a test mode, the running comprising:
operating a first avatar to represent a first computing system in a first computing environment of a first entity, wherein the workflow implementation comprises the first avatar, a set of handlers, and a choreography;
operating a second avatar to represent a second computing system in a second computing environment of a second entity, the intelligent integration system operating in a third computing environment that is different from the first computing environment and the second computing environment; and
receiving a message from the second entity to the first entity, the message containing data, wherein arrival of the data from the second entity triggers the first entity to invoke an integration activity, wherein the integration activity follows the choreography, wherein the choreography has a choreography key, and wherein moving the data through the choreography is defined and governed by the choreography key;
stopping moving the data through the choreography;
at design time:
determining a handler that can meet a requirement of the choreography key that is not met by the set of handlers; and
updating the workflow implementation to include the handler; and
continuing or restarting the workflow implementation in the test mode with the handler that can meet the requirement of the choreography key.

20. A computer program product comprising a non-transitory computer-readable medium storing instructions translatable by a processor for:
running a workflow implementation in a test mode, the running comprising:
operating a first avatar to represent a first computing system in a first computing environment of a first entity, wherein the workflow implementation comprises the first avatar, a set of handlers, and a choreography;
operating a second avatar to represent a second computing system in a second computing environment of a second entity, the intelligent integration system operating in a third computing environment that is different from the first computing environment and the second computing environment; and
receiving a message from the second entity to the first entity, the message containing data, wherein arrival of the data from the second entity triggers the first entity to invoke an integration activity, wherein the integration activity follows the choreography, wherein the choreography has a choreography key, and wherein moving the data through the choreography is defined and governed by the choreography key;
stopping moving the data through the choreography;
at design time:
determining a handler that can meet a requirement of the choreography key that is not met by the set of handlers; and
updating the workflow implementation to include the handler; and
continuing or restarting the workflow implementation in the test mode with the handler that can meet the requirement of the choreography key.

* * * * *